(12) United States Patent
Holliday et al.

(10) Patent No.: US 11,037,067 B2
(45) Date of Patent: Jun. 15, 2021

(54) APPARATUS AND METHOD FOR OCCUPANCY DETECTION

(71) Applicant: Infrared Integrated Systems Limited, Northampton (GB)

(72) Inventors: Stuart A. Holliday, Northamptonshire (GB); Christopher A. Evans, Baldock (GB); Neil Johnson, Devon (GB)

(73) Assignee: Infrared Integrated Systems Limited, Northhampton (GB)

(*) Notice: Subject to any disclaimer, the term of this patent is extended or adjusted under 35 U.S.C. 154(b) by 411 days.

(21) Appl. No.: 15/645,287

(22) Filed: Jul. 10, 2017

(65) Prior Publication Data
US 2019/0012607 A1 Jan. 10, 2019

(51) Int. Cl.
*G06N 7/00* (2006.01)
*G01J 5/00* (2006.01)
*G06N 20/00* (2019.01)
*G06K 9/00* (2006.01)

(52) U.S. Cl.
CPC ............ *G06N 7/005* (2013.01); *G01J 5/0025* (2013.01); *G06K 9/00771* (2013.01); *G06N 20/00* (2019.01)

(58) Field of Classification Search
CPC ..................................................... G06N 7/005
See application file for complete search history.

(56) References Cited

U.S. PATENT DOCUMENTS

| 5,581,625 | A | 12/1996 | Connell |
| 6,712,269 | B1 | 3/2004 | Watkins |
| 7,623,936 | B1 | 11/2009 | Qu et al. |
| 7,652,687 | B2 | 1/2010 | Sorensen |
| 7,702,132 | B2 | 4/2010 | Crabtree |
| 7,778,855 | B2 | 8/2010 | Holliday |
| 8,615,420 | B2 | 12/2013 | Holliday |
| 9,993,166 | B1 | 6/2018 | Johnson et al. |
| 2005/0104959 | A1* | 5/2005 | Han .................. G08B 13/19604 348/143 |
| 2005/0222723 | A1 | 10/2005 | Estes et al. |
| 2007/0008113 | A1 | 1/2007 | Spoonhower et al. |

(Continued)

FOREIGN PATENT DOCUMENTS

| EP | 1798670 A1 | 6/2007 |
| EP | 3229047 A1 | 10/2017 |
| WO | 2019191146 A1 | 10/2019 |

OTHER PUBLICATIONS

Basalamah, A., "Sensing the Crowds Using Bluetooth Low Energy Tags," IEEE Access, 4:4225-4233, Aug. 2016.

(Continued)

*Primary Examiner* — John E Breene
*Assistant Examiner* — Jeffrey C Morgan
(74) *Attorney, Agent, or Firm* — Fredrikson & Byron, P.A.

(57) ABSTRACT

Systems for detecting occupancy of an area comprising one or more zones can include one or more sensors and one or more processors configured to receive sensor data from the one or more sensors over time. The one or more processors can be further configured to receive or store data about an arrangement of the zones in the area. The one or more processors can apply a probabilistic model considering the sensor data received over time to determine the number of subjects in each zone by determining a most likely current state of occupancy of the area among a plurality of possible scenarios.

19 Claims, 11 Drawing Sheets

(56) References Cited

U.S. PATENT DOCUMENTS

| | | |
|---|---|---|
| 2008/0067244 A1 | 3/2008 | Marks |
| 2008/0077511 A1 | 3/2008 | Zimmerman |
| 2009/0097706 A1 | 4/2009 | Crabtree |
| 2010/0039233 A1 | 2/2010 | Niedzwiecki et al. |
| 2010/0061553 A1 | 3/2010 | Chaum |
| 2010/0235004 A1 | 9/2010 | Thind |
| 2010/0299116 A1 | 11/2010 | Tomastik et al. |
| 2011/0024500 A1 | 2/2011 | McReynolds et al. |
| 2011/0213588 A1 | 9/2011 | Lin et al. |
| 2012/0191272 A1 | 7/2012 | Andersen et al. |
| 2012/0274775 A1 | 11/2012 | Reiffel |
| 2012/0281094 A1 | 11/2012 | Forshaw |
| 2012/0310376 A1 | 12/2012 | Krumm et al. |
| 2014/0107846 A1 | 4/2014 | Li |
| 2015/0022321 A1 | 1/2015 | Lefevre |
| 2015/0032556 A1 | 1/2015 | Evans et al. |
| 2015/0224640 A1 | 8/2015 | Vu et al. |
| 2015/0235237 A1 | 8/2015 | Shaw et al. |
| 2015/0339920 A1 | 11/2015 | Cortelyou et al. |
| 2017/0181401 A1 | 6/2017 | Lefevre et al. |
| 2017/0316262 A1 | 11/2017 | Holliday et al. |
| 2018/0089616 A1 | 3/2018 | Jacobus et al. |

OTHER PUBLICATIONS

Connell et al. "Retail Video Analytics: An Overview and Survey," Video Surveillance and Transportation Imaging Applications, Proc. vol. 8663. International Society for Optics and Photonics, Mar. 2013.

Extended Search Report for EP Application No. 14178914.9, dated Jul. 3, 2015, 6 pgs.

International Search Report and the Written Opinion of the ISA/EP in PCT/EP2019/066525 dated Sep. 23, 2019, 14 pgs.

Texas Instruments, "Introduction to the Time-of-Flight (ToF) System Design," Users Guide, Literature Number: SBAU219D, May 2014, 32 pgs.

Texas Instruments, "Time-of-Flight Camera —An Introduction," Technical White Paper, Literature Number: SLOA190B, May 2014, 10 pgs.

Yamamiya et al., "Using Infrared-Transparent Pigments to Identify Objects," Systems and Computers in Japan, 33 (10):74-82, Sep. 2002.

European Patent Application No. 18182793.2, Extended European Search Report dated Dec. 6, 2018, 7 pages.

Antunes, "Multi-sensor based Localization and Tracking for Intelligent Environments," Retrieved from the Internet <https://fenix.tecnico.ulisboa.pt/downloadFile/395143160190/dissertacao.pdf>, Oct. 2011, 88 pages.

Kim et al., "Multiple Hypothesis Tracking Revisited," 2015 IEEE International Conference on Computer Vision, Dec. 7, 2015, pp. 4696-4704.

Senior, Andrew W., et al "Video analytics for retail" , 2007 IEEE Conference on Advanced Video and Signal Based Surveillance. IEEE, 2007, 6 pgs.

International Search Report and Written Opinion of the ISA/EP in PCT/EP2020/050603, dated Mar. 31, 2020, 12 pgs.

Hanchuan, et al., "ID-Match: A Hybrid Computer Vision and RFID System for Recognizing Individuals in Groups", In Proceedings of the 2016 CHI Conference on Human Factors in Computing Systems, 12 pgs.

Fukuda, et al., "Personal identification in dynamic images using UHF band RFID system for service provision", 2008 IEEE International Conference on Multisensor Fusion and Integration for Intelligent Systems, 6 pgs.

\* cited by examiner

A labelled sequence of occupancy values from a location of three Zones (where occupied = 1, unoccupied = 0)

The complete Hypothesis tree for the sequence can be generated. The path(s) through the tree that have the best matching occupancy to the labelled sequence (shown in bold) may be used to train models for transition and observation probabilities.

APPARATUS AND METHOD FOR OCCUPANCY DETECTION

FIELD OF THE INVENTION

The present disclosure relates to occupancy detection and subject tracking apparatus and methods.

BACKGROUND OF THE INVENTION

There is a desire for people (e.g. managers, farmers) and control systems (e.g. building management systems, Heating Ventilation and Air Conditioning (HVAC) systems, Fire alarm systems, etc.) to be aware of how many entities or subjects (especially living things, for example people or animals) that are using a pre(defined) space at various times, for many different purposes. This may be referred to as the "occupancy" of the (pre)defined space. That is, occupancy is an indication of how many entities are within the defined space at a particular moment in time. Accurately detecting occupancy over time may also provide the ability to track subjects as they move around a monitored occupied space.

Prior art systems exist for determining the number of people within one or more rooms, via number of means, including: directly detecting and counting people, using some direct detection/sensing methods such as video analytics from CCTV coverage of the space, direct human counting using automatic counters (people counters or mechanical turnstiles), or manually using a manual clicking device.

These existing systems however have many limitations. For direct methods, these may include: they are expensive, as they require saturation coverage of the tracked space(s); they are inaccurate, as direct sensing can be imperfect due to environmental issues; they are intrusive or have security/privacy issues if they disclose information beyond occupancy (e.g. photos/video of subjects). For indirect methods, these include: they suffer from accumulation of error because the counting means are not perfectly accurate; existing methods to correct for this exist, but require manual setting of correction factors (that are dependent on results are only available at end of day) they do not scale to multiple zone spaces. Thus, the results are not consistent or accurate in a multi-room setting.

SUMMARY

Aspects of this disclosure are generally directed toward systems and methods for detecting an occupancy of an area including one or more zones. Exemplary systems include one or more sensors, each being associated with one or more of the one or more zones and being configured to provide sensor data representative of detected activity in the associated one or more zones. In various systems, the one or more zones can include at least one unmonitored zone for which no corresponding sensor provides data representative of detected activity in the zone.

Systems can include one or more processors in communication with the one or more sensors. The one or more processors can be configured to receive sensor data from the one or more sensors over time, and receive or store data regarding an arrangement of the one or more zones in the area, such as the connectivity between the zones.

The one or more processors can be further configured to apply a probabilistic model to determine the number of subjects within each zone, such as a multiple hypothesis model, for example. The one more processors can be configured to consider the sensor data received from the one or more sensors over time and determine a highest probability scenario among a plurality of possible scenarios. The highest probability scenario can correspond to a most likely current state of occupancy of the area, for example, including the occupancy distribution among one or more of the one or more zones.

The one or more processors can be configured to output an indication of the occupancy of the area, and, in some embodiments, the distribution of subjects among the one or more zones, based on the probabilistic model. Exemplary outputs can include a display of occupancy, activation of an alarm, activation of a function related to an occupancy level, or the like.

DESCRIPTION OF THE DRAWINGS

Various objects, features, aspects, and advantages of the present invention(s) will become more apparent from the following detailed description of preferred embodiments of the invention(s), along with the accompanying drawings in which like numerals represent like components, and in which.

DESCRIPTION OF PREFERRED EMBODIMENTS

Figure 1:
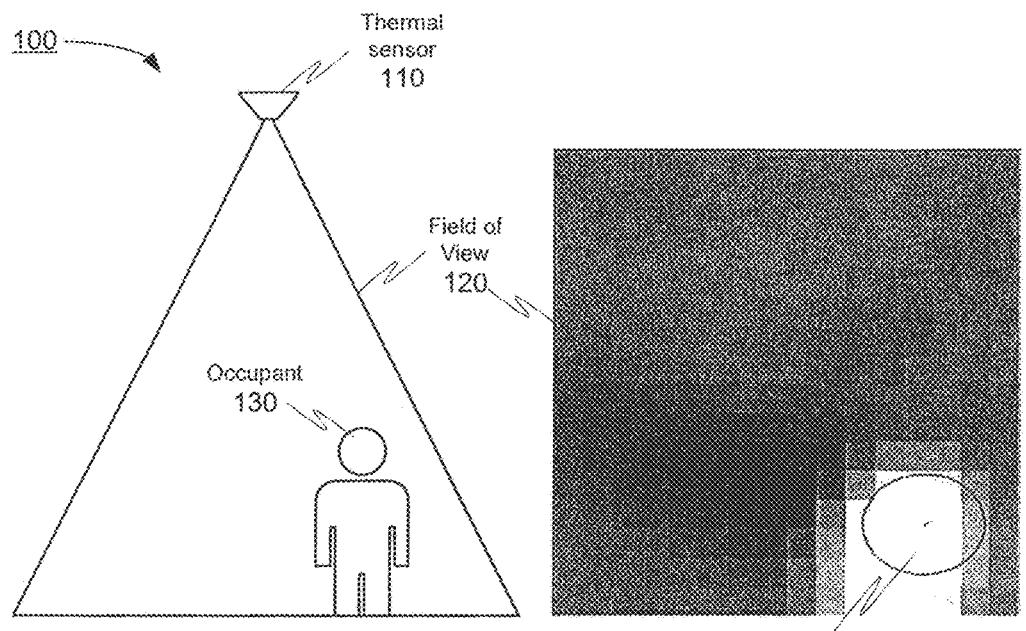
FIG. 1 shows an example of a thermal sensor and corresponding resultant heat image, with a single occupant ('target'), according to an example of the present disclosure.

The following detailed description refers to the accompanying drawings. The same reference numbers may be used in different drawings to identify the same or similar elements. In the following description, for purposes of explanation only and not necessarily for limitation, specific details are set forth such as particular apparatuses, structures, computer architectures, interfaces, methods, algorithms, techniques, etc. in order to provide a thorough understanding of the various aspects of the present disclosure. However, it will be apparent to those skilled in the art, after having the benefit of the complete understanding of the present disclosure that the various aspects of the claims may be practiced in other examples that depart from these specific details. In certain instances, descriptions of well-known devices, circuits, methods, algorithm implementations and the like are omitted so as not to obscure the description of the present disclosure with unnecessary detail for the skilled person.

Within the following description, we use the following terms. The 'overall space' is the overall space being monitored according to examples of the present disclosure. 'Zones' are the individual sub-portions of the overall space being monitored (for example a room, a part of a room, a particular part of a factory floor, a carriage in a vehicle, etc.). Thus, the overall space is made up of a plurality of zones, and a zone may therefore be thought of as a particular instance of an area, space, region or sub-region in the overall space to be monitored for occupancy. A zone may be 'monitored' or 'unmonitored'. A monitored zone is a zone that is covered by the field of view (FOV) of one or more sensors, or more generally, where a trackable entity is (in some cases, ensured to be) capable of actuating the sensor monitoring the zone. An unmonitored zone is a zone where there are no sensors.

A 'subject' is an entity that should be tracked (typically, this is a person, but could be an animal, or other trackable entity), together with the associated data about that entity, such as their current and past locations, and what sensors are detecting that entity.

A 'portal' is a way through which subjects can move in or out of a zone (e.g. a doorway or widow), or the area surrounding the edges of the field of view of a sensor. These are represented in the system by 'zone links', which are the representation of the connection(s) between zones, e.g., which zones connect to which, and may also include a measure of separation as appropriate.

An 'observation' is an event that has been measured or detected, such as a PIR sensor detecting activity in a room (indicative of a person being in that room), a people counter, etc.

A 'hypothesis' is an explanation for a sequence of observations, and may be thought of as a possible occupancy of the overall space (or portion thereof). Each hypothesis has an associated probability (or likelihood) score, which is the chance (or relative chance) of the hypothesis being the correct explanation, given the observations.

A 'target' is a sensor specific set of data, for example relating to some detected activity, possibly including its position. Sensors may maintain a temporally correlated sequence of targets that are linked (assumed to be generated by the same source), and this is known as a 'track'.

The herein disclosed subject tracker is the system that manages the sensors, zone layout information, probabilistic models and hypothesis management, in order to come to a determined answer for the occupancies of the overall space being monitored—e.g., individual zone occupancies and the overall total occupancy, as well as providing control outputs, to allow display, onward control of related tasks, and the like, as will become apparent below.

A pseudocode example to illustrate the sorts of data structures used by the disclosed subject tracker is as follows:

```
class Zone:
        ZoneType zone_type # normal room, doorway, entrance / exit,
        unmonitored space, etc.
        ZonePostion zone_position # the position of the zone within
the building class ZoneLink:
        Zone zone1
        Zone zone2
        ZoneDistance distance # metric of distance between zones
class ZoneManager:
        List<Zone> zone_list # the zones within the building
        List<ZoneLink> zone_links # the connectivity between zones
Class Hypothesis:
        Hypothesis parent # the hypothesis that this hypothesis branched
        from (or null)
        List<Subject> subject_list# information relating to the subjects
        float prior_probability # the probability of this hypothesis prior
to the changes from the current set of subjects
        float probability # the probability of this hypothesis taking
into account an update from the current set of subjects
List<Hypothesis> Hypotheses
class Subject
        SubjectType subject_type # type of the subject, e.g. established,
        noise
        List<Position> position_list # current and past positions
        of the subject
         Zone z # the zone that this subject is in
        float transition_probability # the likelihood we would add this
          subject to the previous hypothesis float observation_probability
        # the likelihood we would generate the observations associated
        with this subject
        List<target> target_list # list of sensor targets associated
        with this subject
class Target
        # sensor specific data relating to observations from a sensor,
        # e.g. position of a target on the ground plane,
        # confidence in its detection,
        # estimated number of people present, etc.
```

There now follows a detailed description of various examples, aspects or other (sub-) portion(s) of the subject tracker/occupancy detection system according to the present disclosure.

FIG. 1 shows an example 100 of a thermal sensor 110, with its specific field of view (FOV) 120, which is also represented here as a corresponding resultant heat image. This shows how a single occupant 130 (which is the 'subject') may be detected by the thermal sensor 100, and hence determine the estimated location of a person, represented here as an ellipse on the heat map, which is an associated 'target'.

Figure 2:
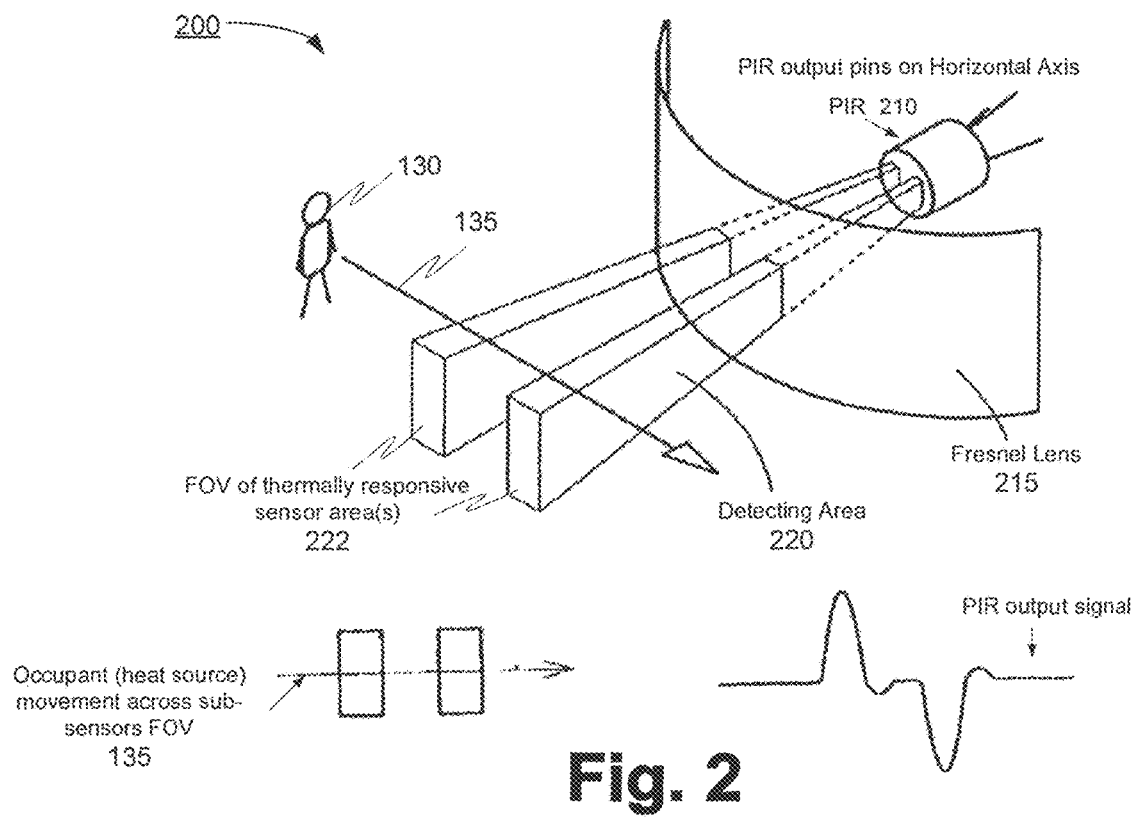
FIG. 2 shows a PIR security type sensor, which is activated by motion across one or more thermally responsive elements, but which does not form any kind of image, according to an example of the present disclosure.

FIG. 2 shows an example 200 of passive infra read (PIR) type security sensor 210 that may be used in examples of the present disclosure. In the exemplary configuration of FIG. 2, the sensor 210 includes a twin slot version, with separate outputs for the multiple horizontally spaced detecting sectors (i.e. the respective effective FOVs 222 of the thermally responsive areas of the PIR 210). This arrangement is only exemplary, and in this case may be activated by motion of a thermally emitting entity (e.g. person occupant 130) moving across the one or more of the thermally responsive areas 222. Notably, the output of such an example sensor arrangement is not an image, but is a time varying PIR output signal produced for each of the sensor areas 222—one for each instance that the thermally emitting entity crosses the respective sector/area 222.

Figure 3:
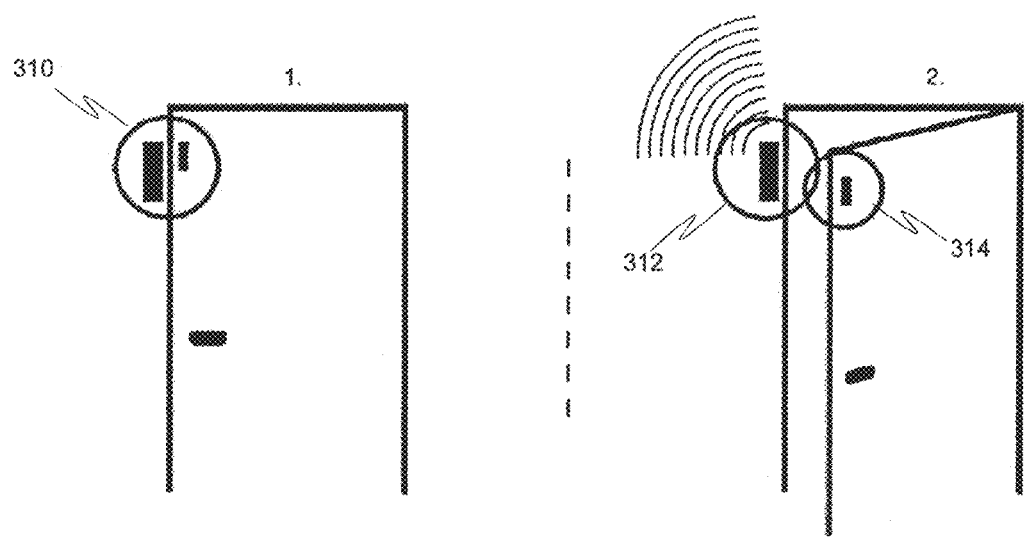
FIG. 3 shows an example use of a magnetic door sensor, according to an example of the present disclosure.

FIG. 3 shows a magnetic door sensor 310 arrangement that may be used in examples of the present disclosure. In this example, the sensor 310, is activated when the door is opened, typically via means of a magnet in the door 314 operating on a switch (e.g. hall switch) in the frame 312 (other examples may have the sensor/magnet the other way round, and/or the sensor 310 may operate by other means, such as light, ultrasound or the like). When such sensors are located on a designated exit/entrance to the overall area, these may be considered in a different manner in the disclosed methods, since they are not operating between different monitored zones of the overall space (i.e. they do not necessarily form a zero sum operation between zones). For example, they may act to add or subtract overall occupant numbers in the overall space, instead of tracking reallocation of the same number of occupants about the overall space. Accordingly, in some examples, the entrances/exits may be associated with generating one or more new hypotheses that people have entered/departed the zone. If the entrance door is closed, which may be known, for example, from a magnetic switch, we may then also know that there is no possibility of someone entering or leaving the zone at that time.

Taking the example of a residential setting (e.g. a home), a person may move around within a room of the home, transit between rooms, enter/exit the home entirely, or otherwise move within the home according to a myriad of different options, dependent on the arrangement of the home, and the desires and actions of the person being tracked within that home. Generally, the same sort of issues arise in any building, or even any other space in which a person may operate—office, ship, car, etc., or indeed animals in their living spaces and the like.

In order to monitor this motion, sensors may be suitably placed in various locations within the overall space, for example by being mounted in a place able to provide sensing cover of the different zones (such as being mounted to the ceiling, esp. in high activity spaces), or specific points within the overall space, such as access points (e.g. doors).

Figure 4:
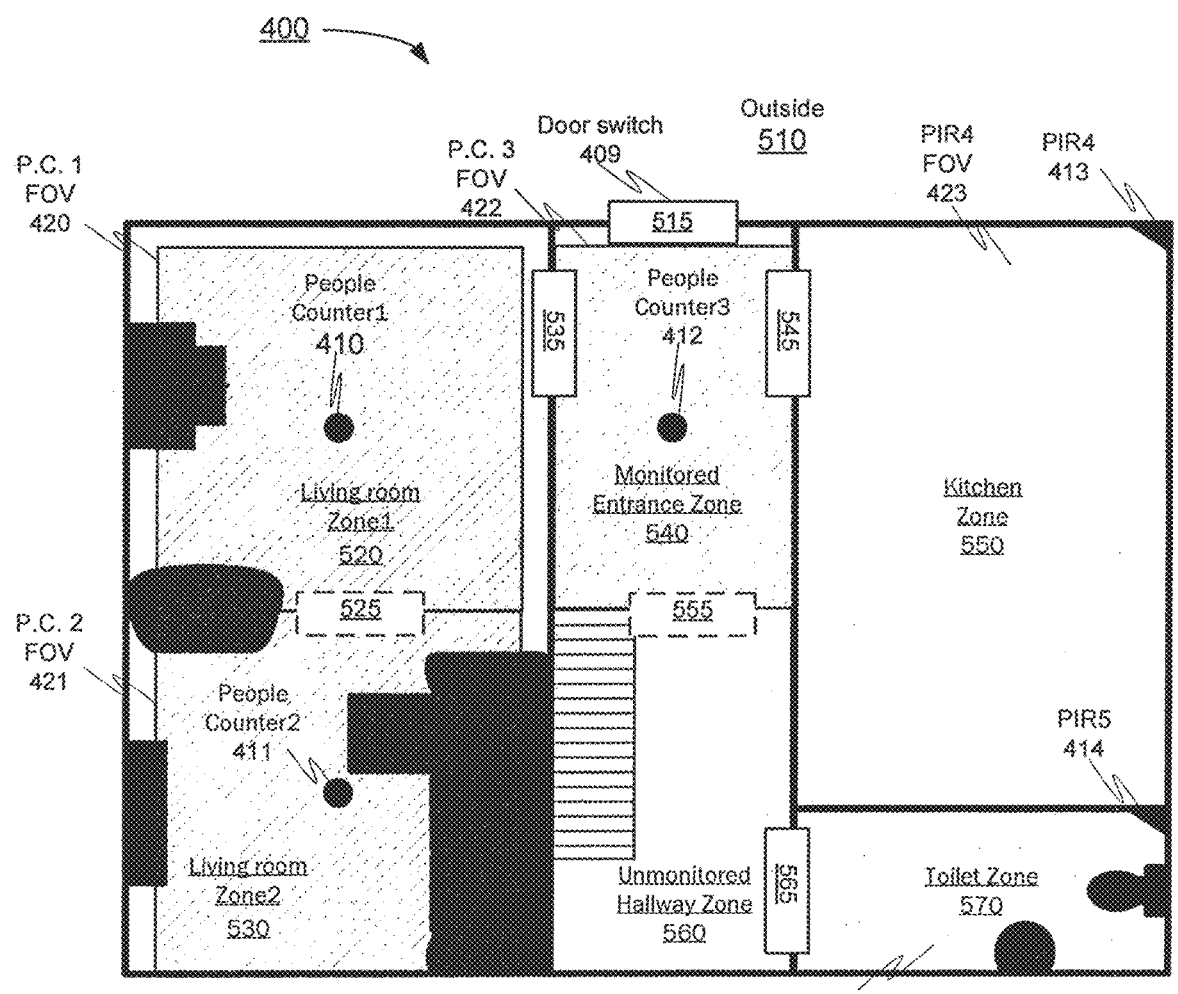
FIG. 4 shows an example setup of the subject tracker system according to an example of the present disclosure.

FIG. 4 shows an example physical setup arrangement 400 of the disclosed subject tracking system in an overall space to be tracked for occupancy. In the example of FIG. 4, the overall space is a home (e.g. the ground floor of a house) where there are multiple zones (e.g. individual rooms in the home, or sub-portions of the larger rooms). The overall space to be monitored comprises: the outside of the home 510; a living room zone 1 520, a living room zone 2 530, an entrance zone 540; a kitchen zone 550; an unmonitored hallway zone 560, and a toilet zone 570. Connecting the different zones are real portals (e.g., access points between zones, for example, a real physical access point, such as an actual door), and "virtual" portals (e.g., in this case, the edges of individual sensor coverage, when multiple sensors are used to monitor a single larger area). In the example, these comprise four real portals—doors 515, 525, 545 and 565 between some zones, and the "virtual" portals 525 and 555, noting the latter is an example where the virtual portal is between the monitored area and an unmonitored area. In this respect, a portal may also be thought of as a change of sensor for a zone, which also includes a change to there being no sensor for this respective (portion of a) zone.

Meanwhile, in respect of the sensors, these may be a variety of different types, with different operational areas or Fields of View (FOVs), or the like. In the specific example of FIG. 4, the sensor suite in use comprises: a door switch 409; People Counter1 410, with its associated People Counter1 FOV 420; People Counter2 411, with its associated People Counter2 FOV 421; People Counter3 412, with its associated People Counter3 FOV 422; PIR sensor 4 413, with its associated PIR4 FOV 423; and PIR sensor 5 414, with its associated PIR5 FOV 424. In the figure, there are the three zones being monitored by three separate thermal sensor based people counters (see FIG. 1), with two in the living room and one in the entrance hall. There are also two zones being monitored by two passive infrared (PIR) type sensors (see FIG. 2), in this case monitoring the kitchen and toilet, respectively. The hallway is also a partially an unmonitored space. There is also the door switch (see FIG. 3) on the entrance door, which may be assumed to be the sole entrance and exit for all persons that may be occupying the overall space. The sole entrance switch may be a more definitive counter of total occupancy of the overall space as a whole, or at least may indicate when overall occupancy can be expected to vary, which may guide the determination of the occupancy of the (sub-) zones over time.

Figure 5:
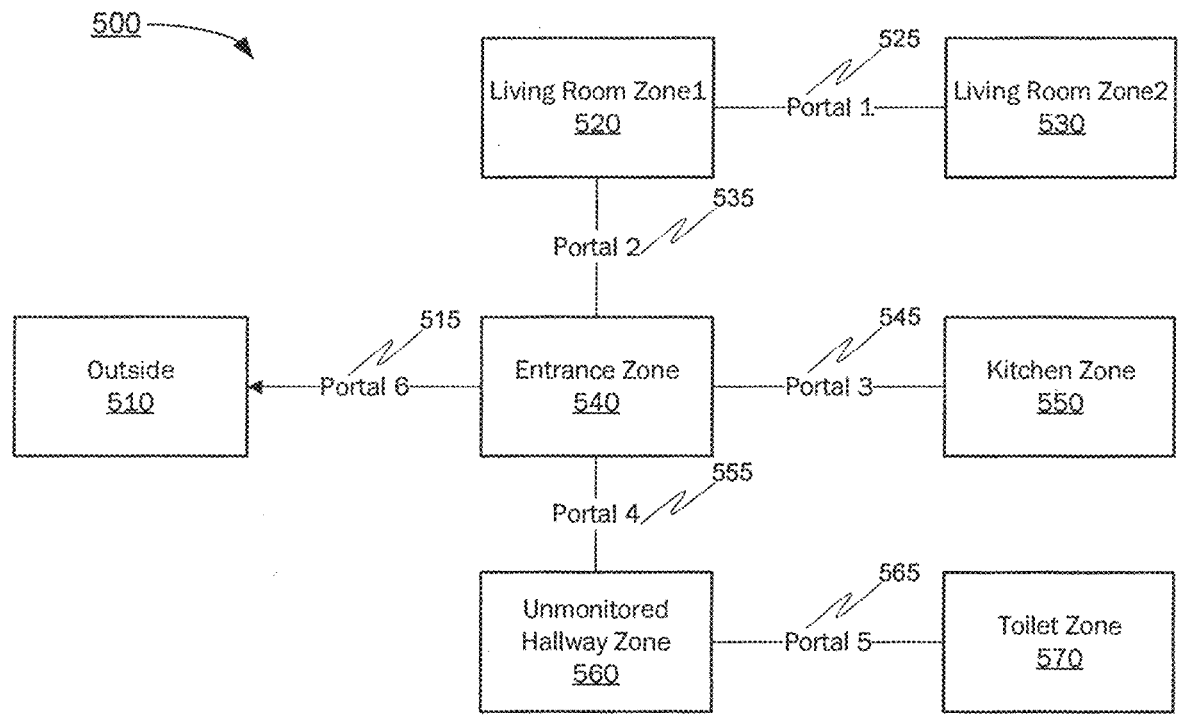
FIG. 5 shows the corresponding connectivity graph for the example overall space from FIG. 4.

Examples further include a system that may be used to centrally coordinate and understand the data collected from the various sensors located about the overall space being monitored (in this example, the house). This system, the below described "subject tracker", can provide information on where the subject is (e.g. in which room, possibly with position within the room), maintain tracking when they transit between rooms, detect targets originated from noise, and detect subjects entering and exiting the house. The subject tracker takes as input targets from sensors (as shown in FIGS. 1-3) and zone layout information of a house (as shown in FIG. 4 and FIG. 5) and provides an output on where the subjects are in the house.

The resultant occupancy and location information may then be fed to other systems, including an alerting system, that can raise alarms in the event of unexpected activity, and a reporting system for allowing third parties (e.g. carers) to monitor and visualize activity patterns.

According to examples, the subject tracker may be configured to deal with one or more of the following:

Within the overall space (e.g. whole house in a residential example), the totality of the overall space may not be covered by the field of view of sensors/detector devices, for example due to limitation(s) on placement opportunities (e.g. thereby placing limitations of view on the devices), budgetary restraints (e.g. thereby limiting number of devices available to be placed), or the like. For example, there may be unmonitored areas in hallways, large rooms, alcoves, doorways, etc. So if a subject moves across these areas, target tracks will have gaps in these unmonitored areas. Thus, to follow the subject continuously, the disclosed subject tracker may associate the tracks on both sides of any gap(s) (e.g., gaps between observations in areas/zones).

Within a zone (e.g. room of the house, or sub-portion of the room under one sensor), when a subject may not be constantly detected (for example due to obscuration and/or the operational limitations of the sensors), a series of separate tracks may be generated for what should actually be the same single track (were these constant detection issues not present). These multiple separate tracks don't necessarily have a sequential temporal order, and can also be spatially far from each other (e.g., further apart in space than may otherwise be immediately expected). So, the disclosed subject tracker may be configured to associate these tracks, so as to form a continuous history of the subject's movement about the zones within the overall space (e.g., the room/sub portions of rooms within the house).

Apart from the subject(s) present, there may be other sources of targets (e.g., sensed entities, but which are not actual subjects to be tracked—such as moving equipment (e.g. fans, etc.), and, in the case of using thermal sensors, other thermal heat sources such as animals). This gives rise to 'environmental noise generated targets'. In this situation, one of the disclosed subject tracker's capabilities is to decide (e.g., reason) if a target is originated from noise, or not, by exploiting information such as room layout, previous subject movement, and target characteristics.

Also, some sensors may be able to indicate only presence (in a greater area), rather than (actual or more accurately placed) location of subjects, and may or may not indicate magnitude (e.g., how many people are present).

The disclosed subject tracker solves these challenges by using a multiple hypothesis approach, which exploits logical and physical constraints arising from the known layout of the overall space (e.g., the layout of the sensors and the zones within the space), combined with both theoretically and empirically determined probabilistic models, in order to determine a logically consistent and complete overall hypothesis (for that point in time, at least) which is most probable (e.g., best explains the observations to date). According to examples, a hypothesis may be the state of the system, e.g., the number of people and their location. Additionally or alternatively, a hypothesis may include associated history leading up to that point (e.g., the hypotheses forming a tree over time). Various examples according to the present disclosure seek to find the most probable hypothesis which explains the observations.

The subject tracker employs zone layout information of an overall space to perform logic based reasoning on events such as room transition, entrance and exit (door counts) and noise targets. For example, knowing the portal type (e.g. door) and portal position between two zones allows the disclosed subject tracker to associate two tracks caused by transiting between two zones.

In such a case, a zone connectivity graph may be defined, either by manual or automatic means.

FIG. 5 is the zone connectivity graph corresponding to the physical layout of the example floor plan in FIG. 4. Within the zone connectivity graph of FIG. 5, the boxes (510; 520; 530; 540; 550; 560; 570) are the zones, and the connecting lines (515; 525; 535; 545; 555; 565) show allowed transitions through portals between the zones, these are what are also referenced hereon as zone links. So in FIG. 5, for example, subjects may move from the outside 510 into the Entrance zone 540 via portal 6, which is zone link 515, because in this example, it is assumed that this is the only way that subjects can enter/leave the overall space that is the property being monitored (here it may be appreciated that the 'overall space' may be deemed to include the outside or not—because the outside is merely 'the place where anyone that enters the space of interest comes from"). In some cases, there may be a sensor outside of the/an entrance, e.g. a PIR covering the entranceway, in which case one could make use of this sensor either as a substitute for a magnetic latch on the door, or one could use it to monitor people entering/ leaving to improve accuracy, if being inside the doorway would be unsuitable for some reason. In some examples, the outside area covered by such a sensor would not be covering one of the 'zones of interest', but would allow a better estimation of the occupancy of those zones.

In the particular case of a building, a magnetic door switch on the front door of the building can be the means to allow the disclosed subject tracker to know that the front door is closed, in which case this zone link can be excluded from further analysis of the most likely hypothesis. This is to say, for many cases, there can be a fairly hard decision on the entrance/exit portal being in operation or not, as it is the most likely portal to be provided with the sensor apparatus(es) to allow the most accurate determination of use (and cost effective—if you had to choose one portal to sensor completely, it is the entrance/exit).

Generating the zone layout may be done automatically or manually, and in the latter case simply comprises noting the layout of the zones and how they connect, which is a straightforward task. An automated means might try to determine the layout of zone links from other sources, such as building plans, or even to infer the best arrangement of zone links, by using an expectation maximization approach, whereby a separate (or conceivably combined) model considers all possibilities for how the zones could be linked, and chooses the parameters so as to best explain the observations. There could be a mixture of these sorts of automated approaches, to come to an automated, yet more accurate since it is guided, approach.

The example overall space of FIGS. 4 and 5 has four rooms, all of which have sensors installed (three with overhead thermal sensors, and two with PIRs), but one of which has two sensors, so there are five monitored zones in the zone graph. However, there is also an unmonitored zone in a hallway (which is itself one half of the overall room), which is also taken into account. Each door in the house is a portal, either connecting to another room or connecting to the outside of the house, but there are also some 'virtual' portals between multiple sensed rooms (e.g., multiple zones in same room). In some examples (not shown), the non-typical access points (e.g. windows, etc.) may also be included into the model and/or sensing regime in place (e.g. to include security aspects, such as unexpected/un-allowed access detection).

Zone Identity and Association

Each target or subject has a zone identity that the subject tracker assigns. For a target or subject, its zone identity is which zone it is currently in. If a subject is located in the overlap between zones, an arbitrary (but consistent) rule can be used to designate which zone the subject is assigned to, for example the zone that the subject is furthest from the edge of, but any other suitable means to consistently select an applicable zone may be used (e.g. according to the implementation parameters of the system in question).

In addition, a target or subject has a portal identity, which indicates if it is close enough to be considered entering or exiting a zone via the respective portal. A distance threshold may be defined for "close enough", for example based upon the furthest that a subject can move without being detected. In an example implementation of the present disclosure, a value of 250 cm was used, to give a reasonably wide margin of safety (at the cost of some reduction in efficiency, since hypotheses may be generated for very unlikely associations when the distance is too far—but again, kept to a reasonable level, for use of the disclosed system in a building with people as occupants). However other distances may also be used.

Whether a target (i.e. sensed entity=sensor "hit") can be associated with a subject (i.e. the actual entity that is meant to be being sensed) may be first determined by their zone identity and connectivity between the zones. For example, the association rules for a subject and a target may be as follows (but not limited to):

If they are both in the same zone, they can be associated, subject to the Euclidean distance between them being less than some predetermined threshold value—again, for example, 250 cm.

If they are not in the same zone, the zone graph will be searched to determine if it is possible to form an association with the subject transiting via portals. If it is determinable that the subject and target are (reasonably) close enough (e.g., the total distance metric is less than a predetermined threshold value), this can then be taken as a nominal (e.g., inferred) transition between zones, and the association between the subject and target can be formed, but subject to the total distance between the subject and target being less than the predetermined threshold value (e.g. 250 cm).

For example, a subject might (actually) be in a first zone, 40 cm from a portal, which is close enough to consider that the subject might move through the portal into a second zone. If a target is then seen (in a short time frame—again a predetermined value, in this case a value of time, rather than distance, and which may be any of use case specific, empirically determined, averaged, etc.) in the second zone connected via the portal, and the target is 20 cm from the portal, then it is (reasonably) possible, as in sensible to assume, that the target is associated with the subject. In this situation, the distance between them would be 40 cm+20 cm+a variable amount associated with the portal (e.g. 0 for an open door, infinity for a closed door). If this total is less than a predetermined 'subject-target-portal' association threshold, then hypotheses may be created in which the two can be associated. In this example, Euclidean distances have been used, but it would be equally valid to use any other suitable cost metric for association, and even one that does not depend upon spatial distance, but on some other metric such as temporal difference between track events, or combination of cost metrics of association (e.g. on time and space). Equally, the cost metric may be based on similarity of appearance from a video sensor, for example. Alternatively, no specific restriction could be used, so long as the probabilities are correctly modelled, in which case, for efficiency, a threshold might be dynamically determined for the point at which an alternative hypothesis (e.g. that the target is generated by noise, or has arrived from outside the building) will always be more probable (and so adding the hypothesis that this instance of the subject and target are associated will never be favorable). In the above described ways, the present disclosure may figure out whether targets seen either side of a doorway are the same person, based on how far the targets are from the doorway.

Figure 6:
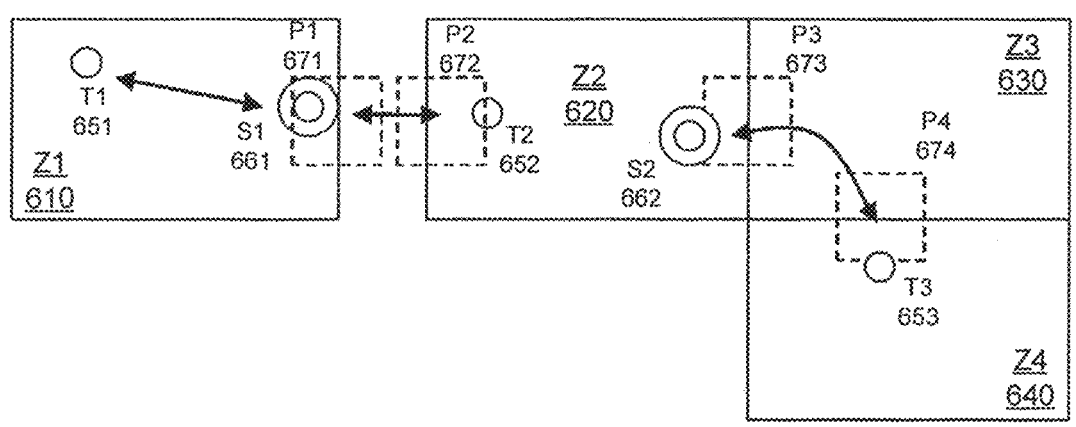
FIG. 6 shows how subjects and targets are associated, including across zones and via portals, according to an example of the present disclosure.

FIG. 6 shows an example 600 of how subjects and targets may be associated, including across zones and via portals. There is shown four zones: Z1 610; Z2 620; Z3 630 and Z4 640.

In this example, subject S1 661 and target T1 651 are in the same zone (Z1 610), so they can form an association if the distance between them is less than some threshold value. Subject S1 661 can also associate with target T2 652, as they are both close to linked portals of their zones (P1 671 and P2 672, respectively), which means they could (reasonably) validly form an association indicating the subject S1 661 transiting from one zone to another—from Z1 610 to Z2 620.

In a separate case, subject S2 662 can associate with target T3 653, for example if the distance between them is less than some association threshold value. In another example shown, when portals are sufficiently close (e.g. distance less than a pre-determined threshold), in this example P3 673 is near enough to P4 674, it could happen that a subject (e.g. S2 662) transits from zone Z2 620 to Z4 640, and is not detected while they are moving through Z3 630, for example if the total distance S2<->P3<->P4<->T3 is less than the threshold amount (e.g. 250 cm). Thus, a hypothesis that this undetected transit of the subject has happened can be added to the set of hypotheses available to select from.

All associations on the zone connectivity graph are subject to association distance between subjects and targets. For example, we may use dist (S, T) to denote the Euclidean distance between targets, subjects and portals—e.g.

$$|S-T|=\sqrt{(S_x-T_x)^2+(S_y-T_y)^2}$$

In this case:

If a subject S1 and a target T1 are in the same zone, association distance=dist(S1, T1).

If a subject S1 and a target T2 associate via portals P1, P2, the distance is made up of several distances: association distance=dist(S1,P1)+dist(P1, P2)+dist(P2, t2), where dist(P1,P2)=is either the physical distance, or may be some other function (e.g. for unmonitored zones this may be a configurable parameter, or zero. or a function of time). P1 and P2 can be taken as the ground-plane center of the portal, or the closest point on the portal, as appropriate. Setting a non-zero value reduces the probability of passing through this portal, thus making hypotheses that do this (i.e. for which this applies) less probable, hence more likely culled (see below).

The 'subject tracker' may utilize an entity tracking decision algorithm. This may use aspects of a Multiple Hypotheses Tracking (MHT) algorithm for tracking entities by data association. The aforementioned subject tracker entity tracking decision algorithm builds on and modifies the general case of the MHT algorithm to suit the kinds of data and constraints specific to the domain of occupancy detection and/or subject tracking (e.g. in overall spaces having a plurality of zones, connected by certain arrangements of portals, etc.).

At any given point in time, with known subjects, and targets, the entity tracking decision algorithm can form a set of hypotheses of how subjects and targets associate, in order to provide a decision on what are valid detections of valid entities to be tracked within the overall space, from which the occupancy can be derived as detailed below and the tracking of the subjects also derived, where applicable.

A hypothesis represents an explanation for what has occurred in light of observations/sensed data by the system, e.g., who or what is where, and how they have moved over time.

In standard MHT, the set of possibilities may be exhaustive, i.e. including all logically possible associations between subjects and targets, and, within the set, each hypothesis is exclusive to each other, i.e. each is an alternative explanation of the sequence of observations. MHT is typically used in a context where there is a constant stream of observations of one particular kind (e.g. radar signal data), from one or more similar sources, which may have significant noise, and usually with no particular spatial constraints. The observations are assumed to be independent, and relatively straightforward probability distributions (e.g., normal and uniform) may be used to estimate the likelihoods within the probabilistic model.

The present disclosure modifies the standard MHT algorithm in a number of ways to form the basis of the disclosed entity tracking decision algorithm. For example, to make it suitable for the problem space of occupancy of multiple zones, some of which may be unmonitored, where there are constraints upon the movement of subjects between zones, and with sensors that provide differing qualities of data, and also to allow it to be tractable by reducing the number of hypotheses to a manageable number (for example 100), such that a significant area with several zones with sensors can be monitored with normal computing means, such as a standard PC or embedded computer, without running out of either computing resources (CPU time) or memory.

Examples of the present disclosure may also add steps to ensure that the hypotheses probabilities do not become degenerate (i.e. the system doesn't end up with zero probabilities for events which are very unlikely, but not impossible—since it may be desirable that examples can still handle the improbable events), and to limit the length of each hypothesis/hypothesis tree (see below) within the time domain (e.g., how long a history of subject past states is maintained, in the form of a chain of links to parent hypotheses).

Figure 7:
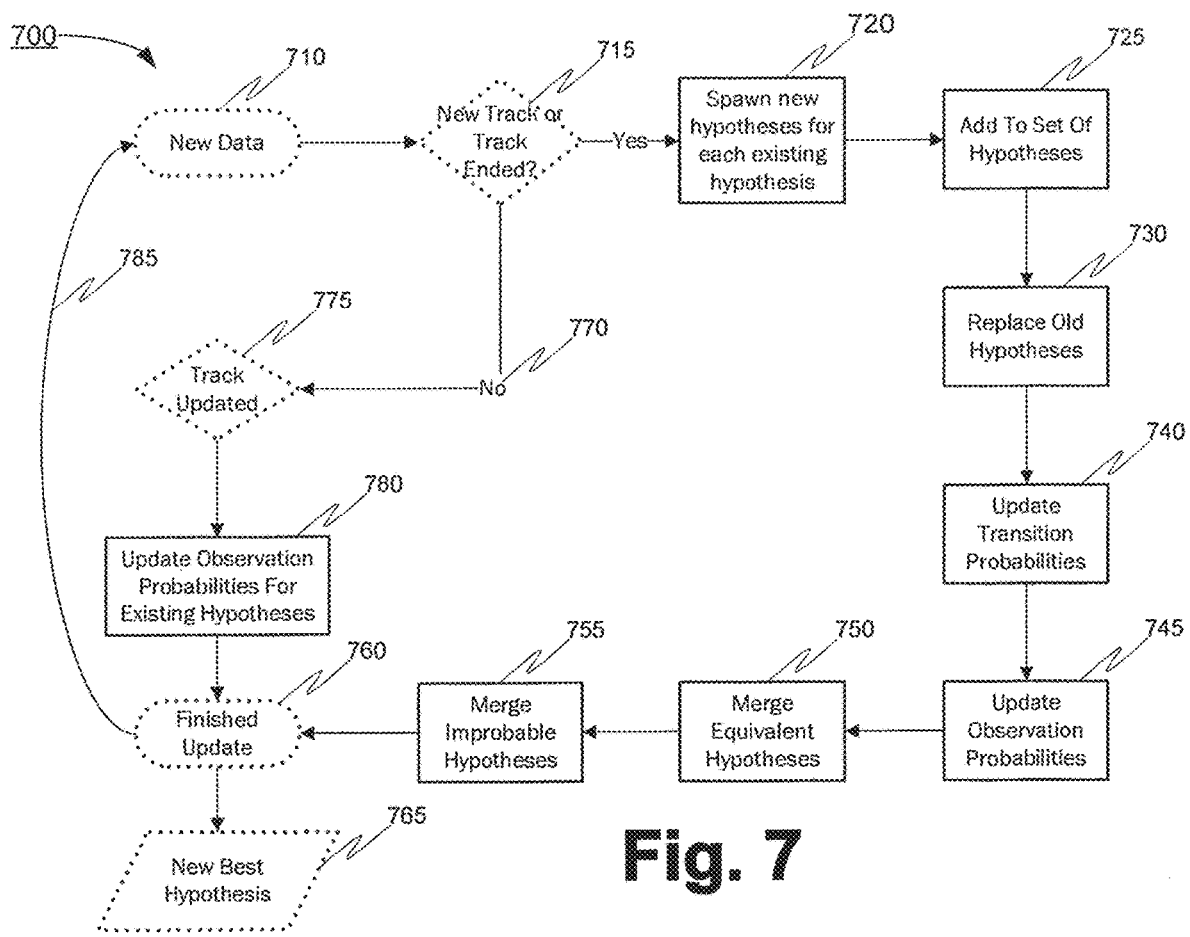
FIG. 7 shows an example operation of the disclosed subject tracker system, according to an example of the present disclosure.

An example operation of the subject tracker is shown in FIG. 7.

The entity tracking decision algorithm process is carried out iteratively, with each iteration being carried out within a predetermined time period, typically called a time step. The output of each time step is the production of a set of hypotheses for the overall space (e.g., the whole area) being assessed for occupancy, where each hypothesis in this set is a hypothesis of subjects, one for each entity being tracked (e.g., person, animal, etc.). Each time step, the subject tracker is updated with a new set of observations from the various sensors located about the overall space being assessed for occupancy (including any and all (sub-)zones, etc.). These may typically detect locations of activity. Every existing hypothesis may be updated with this new information separately, each spawning a new hypothesis to explain the new observations. The set of new hypotheses thus created is then the new set of hypotheses for the next iteration.

Sensor activity that is spatially and temporally correlated may be grouped together into a track, in order to reduce the number of hypotheses generated, so as to keep them to a manageable number. Hypotheses may be spawned only at the start of each track. This differs from the standard MHT algorithm, where hypotheses for every combination of associations between targets and subjects would be generated on every time-step.

Each new track can lead then to the generation of one or more new hypotheses, from each existing hypothesis. The set of new hypotheses replace the old hypotheses within the system (since between them they cover all possibilities). Examples of updates to hypotheses may include (but not limited to):

Detection of motion could indicate that a new subject has entered the building, in addition to those already in the hypotheses.

The detected motion could be related to any of the existing subjects in the hypotheses (this can result in the generation of multiple hypotheses, since there can be many combinations of associations).

The detected motion (e.g. a sequence of target positions, also called a track) could be some environmental noise, and not in fact related to any subject at all.

At the end of a track, when no more activity is detected, examples may also spawn additional hypotheses, for example, for each hypothesis, if a subject's only associated targets came from the track that has ended, the method may add a hypothesis that the subject has left the building, and a hypothesis that they have not left the building. However, some possibilities may be ignored (e.g. leaving the building) if other sensor(s) prove this to be an impossibility, for example, in this case all entrances to the building are known to be sealed, within a time window around the hypothesis update in question, e.g. from magnetic door latch sensors.

In broad terms, the disclosed subject tracker updates its probabilities as follows:

First, all existing hypotheses have their probabilities updated to reflect changes to their associated target tracks, and the passage of time. This may be implemented by updating the most recent observation likelihood information for each hypothesis (e.g., as detailed below) and then recalculating the respective hypothesis probability. This allows the probabilities to be updated without needing to spawn new hypotheses, helping to reduce the number of hypotheses to a manageable amount, as opposed to the standard generalized MHT approach where this step is achieved via spawning new hypotheses on every step.

The hypothesis probabilities may be calculated by forming a chain of likelihood updates, for example using a derivation from Bayes Theorem, or some other equivalent likelihood or probability estimation function, for example sampling a probability distribution such as the Poisson distribution. The likelihood of a given hypothesis may be equal to the prior probability of the hypothesis (the starting probability for that hypothesis), multiplied by a transition likelihood for each update transition in the hypothesis (where a transition may represent a data (target track) association, noise target, subjects leaving the building, etc.), and also multiplied by an observation likelihood for each update in the hypothesis.

Pseudo code for this is given below:

```
UpdateHypotheses(TargetList new_targets, Hypotheses hypotheses):
    # Update the likelihood of all hypotheses
    # to take into account the motion of the Targets
    # we have lost a Target that we were previously tracking, or we have a new Target that we weren't previously tracking
    if HaveLostTarget(new_targets) or HaveNewTarget(new_targets):
        hypotheses = SpawnNewHypotheses(new_targets, hypotheses)
    for each Hypothesis h in hypotheses:
        UpdateLikelyhood(h, new_targets)
UpdateLikelyhood(Hypothesis h, TargetList new_targets):
    # Update the likelihood of a specific hypothesis
    # to take into account the motion of the Targets
    current_likelihood = h.prior_likelyhood
    for each Subject s in h:
        # Update each subject with changes in its position due to its associated Target(s) new information
        UpdateSubjectState(s, new_targets)
        UpdateObservationProbability(s)
```

```
            # multiply the initial likelihood by the initial (transition) likelihood
            # of associating the Subject with the Targets
            # and then with the likelihood of observing the motion of the targets up until this point
            current_likelihood = current_likelihood * s.transition_likelihood * s.observation_likelihood
        h.current_likelihood = current_likelihood
UpdateSubjectState(Subject s, TargetList new_targets):
        # Update the accumulated data stored about the targets associated with s
        # such as the history of positions or signal strengths of the Targets
UpdateObservationProbability(Subject s):
        # set s.observation_probability to the conditional probability that we would see the motions of the targets associated
with
        # the Subject s, given that the targets are generated by the subject
        if s.IsNoiseSubject( ): # subject represents noise (not a person)
                s.observation_likelihood = FindObservationLikelihoodForNoise(s)
        else if s.IsTrackedSubject( ):  # subject represents a person that is associated with Targets
                s.observation_likelihood = FindObservationLikelihoodForNotNoise(s) * FindTargetSpreadLikelihood(s)
        else:    # subject represents a person but there are no active targets
                s.observation_likelihood = FindNoObservationLikelihood(s)
FindObservationLikelihoodForNoise(Subject s):
        # return the conditional likelihood of seeing the Target motion associated with s, given that it is noise
        # e.g. return a sample from an exponential PDF that reduces in likelihood
        # as the Target(s) associated with s move further from their starting position
FindObservationLikelihoodForNotNoise(Subject s):
        # return the product of the conditional likelihoods of seeing the motion of the Targets associated with s,
        # given that they are all truly generated by the same Subject
        # e.g. for each sample a point from the PDF that is a Y mirror of the noise likelihood above
        # scaled to have total area of 1
FindTargetSpreadLikelihood(Subject s):
        # return the conditional likelihood that the group of Target(s) associated with s
        # spread out as much as they have been seen to, given they are all truly generated by the same Subject
        # e.g. return a sample from a pdf which reduces as the maximum spread of the targets increases
FindNoObservationLikelihood(Subject s):
        # return the conditional probability of seeing no Targets, given that there is a Subject present
        # e.g. return a sample from a pdf which reduces as the amount of time with no activity increases
SpawnNewHypotheses(TargetList new_targets, Hypotheses hypotheses):
        Hypotheses newHypotheses = [ ] # empty list of hypotheses
        for each Hypothesis h in hypotheses:
                newHypotheses.append(SpawnNewHypothesesFromHypothesis(h, new_targets))
SpawnNewHypothesesFromHypothesis(Hypothesis h, TargetList new_targets):
        # return a list of hypotheses generated based on this hypotheses given the target list
        # add all possibilities for:
        # Target is a new Subject (new to Location)
        # Target is associated with existing subject
        # Target is associated with a new noise Subject (target is noise)
        # Subject has left the Location
        # the new Hypothesis h.prior likelihood of each new Hypothesis should be equal to be the parent h.current_likelihood
        # the Subject s.transition_likelihood should be set based on the likelihood of each of the above happening,
        # given the states (positions) of the targets and subjects
```

So, for example, if we have a hypothesis that there is nobody in the building, and then we detect a new target track, we will spawn a hypothesis that a new subject has entered the building, as well a hypothesis that the target is a noise subject.

The hypothesis probability in the new subject case is the prior probability (e.g., a starting probability that there is nobody in the building) multiplied by the likelihood that we might have transitioned to there being one person in the building (related to how close the detected activity is to the entrance), and then we go on to update the hypothesis with an observation likelihood—how well does the observed target track fit in with the possibility that there is exactly one person in the building. If the target is moving around, then the observation likelihood (that this is a genuine non-noise subject) will be relatively high, whereas the observation likelihood for the alternative explanation (that this is some environmental noise) will be relatively low.

Likelihood values are normalized by dividing each hypothesis likelihood by the sum of all hypothesis likelihoods, in order to convert back to probability values—operating on the assumption that all possibilities have been considered.

In a more detailed example, as shown in FIG. 7, an example 700 of the disclosed track update method comprises receiving or otherwise acquiring new data 710 from the sensors tracking subjects, a decision 715 can then be made to create a new track(s) or end an existing track(s). If a new track(s) is created (or existing track(s) ended), new hypotheses can be spawned 720 for each existing hypothesis, which are then added to the set of hypotheses 725, which can then replace 730 the previous/existing hypotheses, for which the transition probabilities can them be updated 740 (see below). Next the observation probabilities are then updated 745, after which any equivalent (and still fairly likely—e.g., not yet improbable) hypotheses can be merged 750, and then any improbable hypotheses can also be merged 755, if applicable. The update may finish 760 at this point, until new data is received or otherwise acquired 710. It should be noted that in some examples certain parts of the overall method may be omitted, as applicable for the particular situation in which the method is being applied.

Meanwhile, if there is no new track(s) to be created, or existing track(s) to be ended, the track(s) may instead be updated 775, including updating the observation probabilities for each existing hypothesis 780, after the process again finishes 760 until the next new data is received or otherwise acquired 710. At each cycle, a current best hypothesis may be determined 765, which may be a new best.

Likelihoods for transition probabilities (740 in FIG. 7) and observation probabilities (745 in FIG. 7) may be calculated in many different ways, depending upon the type of transition, and the number and type of observation(s).

However, all transitions likelihoods may be multiplied by a prior probability, which is the probability of the transition occurring, without regard to any other evidence (which may be determined based upon empirical data). For example, in some training data, 95% of targets may be associated with existing subjects, 4.7% may be associated with Noise, and 0.3% may be associated with new subjects.

Transition probabilities for transitions that add a new subject to the overall space (e.g., a building such as described in the specific example) may relate to the likelihood of a target track being associated with a new person entering the overall space (e.g., being monitored for occupancy), which may be, for example, a function of the distance between the target track and the building entrance(s).

One possibility is to use a probability density function (PDF) which decreases in likelihood as x (the distance between the target and the entrance) increases. An example of a function of this type is the exponential distribution:

$$f(x;\lambda) = \begin{cases} \lambda e^{-\lambda x} & x \geq 0, \\ 0 & x < 0 \end{cases}.$$

Figure 8:
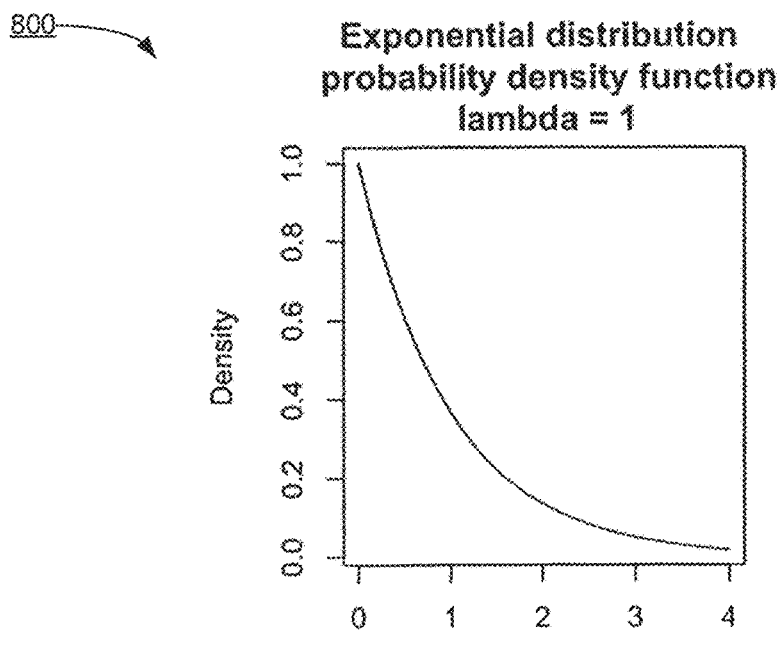
FIG. 8 shows an example exponential distribution, according to an example of the present disclosure.

This is shown in graphical form 800 in FIG. 8. In an example case, the optimum lambda value for the sensor data may to be 0.025, where x is expressed in centimeters, based upon empirical results.

The transition probability of a target track being associated with an existing subject in a hypothesis relates to the distance between the subject and the target track (possibly including distances spanning zones, e.g. if the target track is on the other side of a doorway, or unmonitored zone, from the subject), and/or it may also relate to the time since that subject was last associated with a target track (e.g. a person can only move so fast, for example through an unmonitored space).

In empirical testing it was found that using the same distribution, above, gave good results.

The transition probability for a target being marked as noise can be difficult to model in a straightforward mathematical way, for example when it is unclear what the distribution of noise targets should be, over the overall space (or area of a particular sensor, or sensor type). One approach is to assume a uniform distribution (e.g., a constant likelihood of seeing noise anywhere within the overall space, or just a given area). However, in some cases it has been determined that a reasonable solution is to assume that the likelihood relates to the distance to the other subjects in the hypothesis—e.g., a noise source is less likely very close to a non-noise subject, falling to a background constant level beyond a certain maximum distance. Thus, in some examples, the distances are limited to an arbitrary maximum value of 250 cm. Relating noise target likelihood to distance to subjects is useful, because it enables scaling of the likelihood values to maintain a suitable balance between hypotheses in a logically consistent way, which enables improved performance, and in particular accuracy (e.g. tolerance to false findings).

Figure 9:
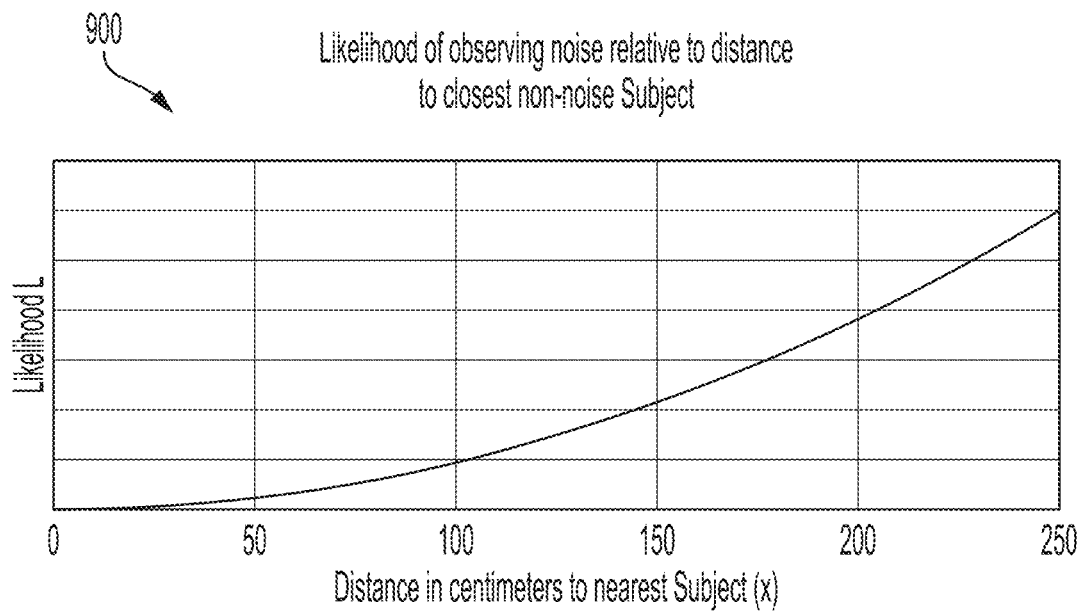
FIG. 9 shows an example graph of likelihood of observing noise vs distance, according to an example of the present disclosure.

FIG. 9 shows one such function in graphical form 900, where the equation used for the graph is $L = 3*x^2/250^3$. The constant in the equation above was determined empirically to give good results on data for building occupancy detection. It will be appreciated that different parameters of the overall space being monitored (e.g. sizes of zones, number, type, subject constraints, etc.) may lead to a different selection of the function to use.

Observation likelihoods are the likelihood of an observation given a hypothesis. For example, if our hypothesis is that there is one person in a building, and we are seeing two targets close together, perhaps that may have a reasonably high likelihood of the hypothesis being correct. However, if the target tracks move apart, then the likelihood of a single person generating that observation would be very low, whereas a hypothesis that one of the target tracks is the person, and the other target track relates to environmental noise might have a higher observation likelihood—unless both target tracks are moving significant distances, in which case a hypothesis that there are in fact more people in the building would have a higher likelihood of being correct.

In order to calculate the observation likelihoods for targets associated with Noise, examples may use an exponential Probability Distribution function (PDF), as above, such that as distance moved (x) increases, the likelihood decreases asymptotically towards zero. The lambda in this case is 0.08.

Figure 10:
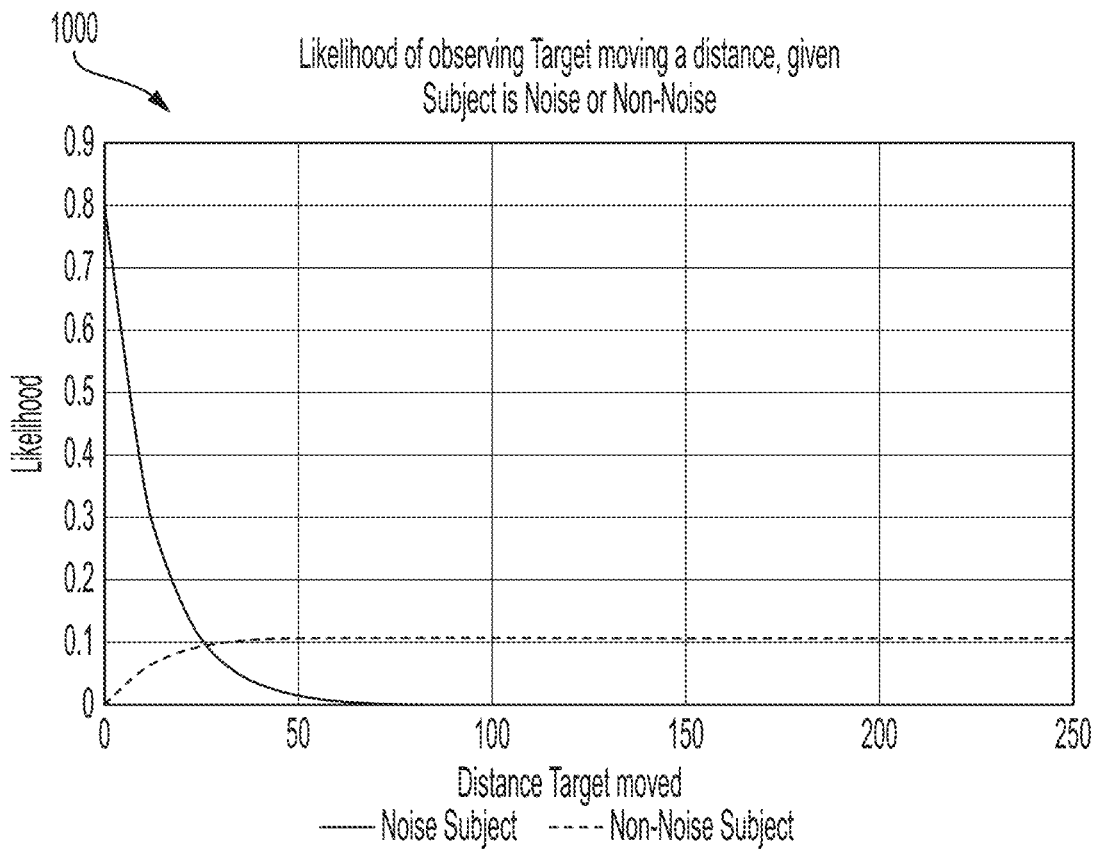
FIG. 10 shows an example graph of likelihood of observing target vs distance, according to an example of the present disclosure.

To calculate the observation likelihood for targets associated with non-noise subjects, we may use the complement of the above, e.g., a function which increases in likelihood as the distance moved increases, as shown in the graph of FIG. 10. In this example, the function used is:

$$k*(\lambda - \lambda e^{-\lambda x})$$

Where k is a scaling constant, such that the integrated area under curve sums to one, over the range (0, MAX_EXIT_THRESHOLD), where MAX_EXIT_THRESHOLD is some constant for the maximum distance at which a target can be considered to be associated with a subject. In our example 250 cm was used, based on empirical results. The scaling constant is used to maintain the balance—if it is not used, then the integrated areas would not be equal for the PDFs in different cases, resulting in the results not normalizing to true probabilities, and hence leading to incorrect results.

One important aspect of observation likelihoods is that they must be able to deal with a particular problem associated with having multiple hypotheses—that a hypothesis with more subjects in it tends to have a higher likelihood than one with fewer subjects in it, as it is more able to explain any particular set of observations. In order to provide for this, examples therefore also update subjects in each hypothesis which do not have any target tracks associated with them. These represent subjects who are not currently being tracked, perhaps because they are not visible to any sensor (e.g. are obscured or are very stationary in the case of motion sensitive tracking sensors). To deal with this, examples also provide a function which gives the likelihood of a subject not having been tracked by any sensor for a certain period of time. This function can be learnt (see below), or at least it can be a simple exponential reduction (decay) in likelihood with time.

Learning the Model

For our model, our parameters and functions to calculate the likelihoods or transitions and observations were set using a novel supervised learning approach.

According to the disclosed learning model, sensor data was labelled to produce a time series of number of subjects in each zone. The data was then run through the subject tracker system to produce a set of possible hypotheses which could explain the count (which may be corroborated manually).

At each step, the hypotheses are sorted based such that those which have the correct number of subjects in each zone are highest, and then a cost metric is calculated, using some simple greedy heuristics e.g. cost increases as the distance between subjects and associated targets increases. The lowest cost hypotheses are first in the sort. The hypothesis which is first in the sorted list is the best explanation hypothesis (e.g., it has least error vs the manual and the lowest cost heuristic).

After each step, only the best 'n' hypotheses are maintained, the others being discarded. Once all of the data has been processed, the final best hypothesis is chosen as best explaining the manual data. The parameters are then set using an expectation maximization approach so as to generate the highest likelihood for the selected best hypothesis. The prior probabilities can be directly generated from the sequence of events in the best hypothesis, e.g., the probability that a target is Noise. The transition and observation probabilities can be set, either by fitting parameters of models, such as the correct Lambda value for exponential distributions, or by fitting a PDF function to the values associated with the best sequence, for example if we wish to train an estimator for the PDF function for a target being observed as a distance 'x' from a genuine subject. It is also possible to determine good values for parameters such as the maximum distance that a target can be associated with a subject, based upon what is occurred in the best hypothesis sequence.

Care should be taken to ensure that all probability densities functions generated from the disclosed methods are equally weighted (e.g. integrate to 1), in order that the likelihoods of different hypotheses are fairly weighted, regardless of the number of subjects or noise associations within each hypothesis. If this is not done, there can be a continual bias towards a particular hypothesis, e.g. a hypothesis with more subjects.

One example of this is in the noise vs non-noise likelihood. The noise likelihood could be considered to be a constant (e.g., uniform distribution), but then there is a question of how to scale this with regard to the non-noise likelihood. An exemplary solution, according to examples of the present disclosure, can be to make the probability a function of distance, and to limit the maximum distance to an arbitrary but realistic threshold (for example, 250 cm or an approximation of how close people may naturally get in normal non interaction). This way, both the noise and non-noise likelihoods can be scaled such that their integrated value sums to one. For example, if we see a target near a subject, if they are more than 250 cm apart, they cannot be the same person. Whereas, if they are closer than this, there is a small but increasing chance that they are the same person. If they are on top of each other, they are very likely to be the same person.

Thus, in some such cases, there exist two possibilities, one in which the target is from the same person as the subject, the other is that the target is noise, unrelated to the subject. Logically, in some such examples, the closer they are together, the higher the chance that they relate to the same person, and since there are only two possibilities, the chance that one of the targets is noise must fall as they become closer together, since the probabilities must sum to 1.

Within the subject tracker, there are multiple hypotheses being updated in parallel, providing alternative explanations of the observed world. These are managed. For example, with each new target track, the disclosed subject tracker adds to the growing set of hypotheses. Therefore, it may be beneficial (at least in live operation) to limit the number of hypotheses to a maximum total number, so that the system does not run out of resources (memory, processing time). This may be achieved by a number of means, for example by means of merging equivalent hypotheses, culling unlikely hypotheses, limiting time duration of hypotheses, as discussed in detail below.

Merging equivalent hypotheses: Frequently, two or more hypotheses may diverge slightly—for example, where there are a pair of people in a hypothesis, and a new pair of target tracks, there are two ways that the people may associate with the target tracks (two explanation hypotheses). After a short amount of time, the two hypotheses may be largely exactly the same, the only difference being whether person A is at location A, and person B at location B, or it is person A at location B and person B at location A. If we do not care which person is which (e.g., if we are only interested in knowing how many people are in each room, not which person is in each room), then these hypotheses may be merged together, by simply summing their probabilities and removing all but the most likely. This can dramatically reduce the number of hypotheses that need to be considered, hence improving performance of the system without detracting from the accuracy of the system, at least at the level of accuracy sought.

Culling unlikely hypotheses:—When a hypothesis becomes extremely unlikely, it begins to be of low value to maintain it. Indeed, a hypothesis may become so unlikely that it will never become favorable to select it, regardless of what is observed. This point can be calculated, by considering the transition probabilities of other existing hypotheses—for example if there is a sequence of transitions which will lead to the same state as the current hypothesis, and that sequence is more likely even with worst case observation probabilities, then the current hypothesis will never be selected, and can therefore be removed.

Another strategy for removing hypotheses is to simply cap the number of hypotheses at a maximum total number, determined by the constraints of the hardware that the system will run on. In some examples, we consider a maximum of 100 hypotheses. In this case, it is desirable to keep the most likely hypotheses, and remove the least likely. Examples may also try to maintain a certain variety of hypotheses—in particular examples may reserve a certain number of 'slots' for hypotheses with differing numbers of subjects suggested to be in the building, so that the system doesn't lose track of these possibilities as the number of hypotheses grows over time.

When hypotheses are removed, they can be merged with the hypotheses that the removed hypotheses are most similar to, in terms of number of subjects in the overall space (e.g. people in the building), and then in terms of the number of subjects in each zone (e.g. room/location), since that is the actual information that an occupancy system is particularly trying to determine.

Limiting time duration of hypotheses:—a hypothesis represents not just the current state, but also the sequence of past states over time, that resulted in the current explanation for what has occurred. As such, hypotheses grow in size as time goes on. Depending upon the application, this can be addressed in different ways. In the simplest case, all history can be removed immediately after it is no longer required for calculations—this would mean that only the current and last state are kept, in such a case. However, in many applications it is desirable to be able to look back to decide the best overall sequence of events in the past.

One approach is to look at the past states of all existing hypotheses. At some point in the past, these will converge to all be equal. The history up to this point can be recorded, and then removed from all hypotheses, since they all agree.

Another approach is to remove history once it reaches a certain maximum length, either in terms of events or time. In this case, the history will be bounded to a maximum length, but this may be sufficient for many applications.

Figure 11:
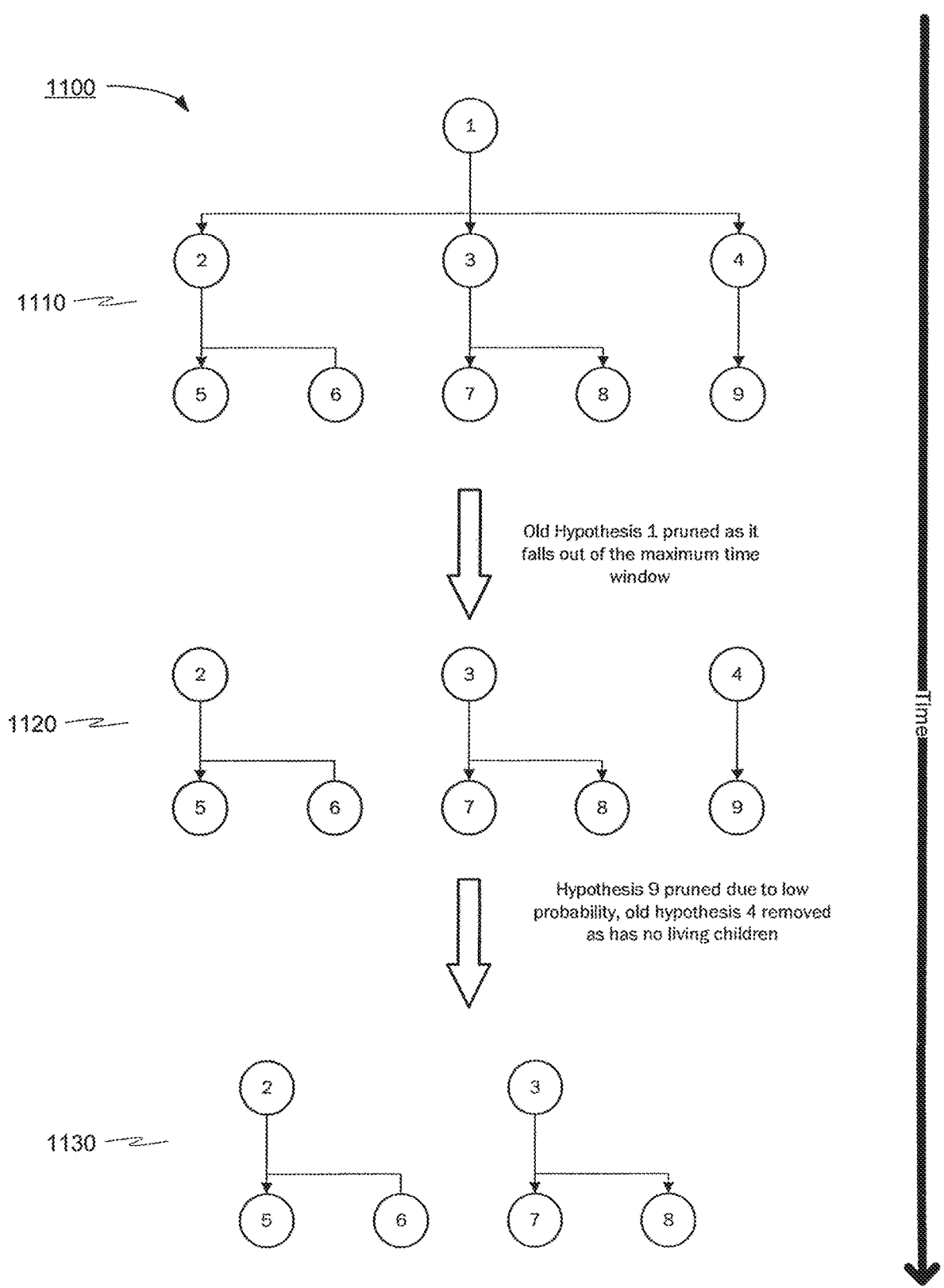
FIG. 11 shows pruning of a tree of hypotheses, according to an example of the present disclosure.

FIG. 11 shows an example pruning 1100 (i.e. culling) of a tree of hypotheses, with an initial hypothesis tree arrangement 1110, a second (in time) hypothesis tree arrangement 1120, and a third (in time) hypothesis tree arrangement 1130. In this Figure, at the transition from 1110 to 1120, as hypothesis '1' falls out of the time window in which hypotheses are stored, it is removed. Also, as hypothesis '9' becomes improbable (in 1120), it is removed, and its parent hypothesis is also removed from the history, as it no longer has any child hypotheses, and thus no longer serves any purpose at 1130.

Figure 12:
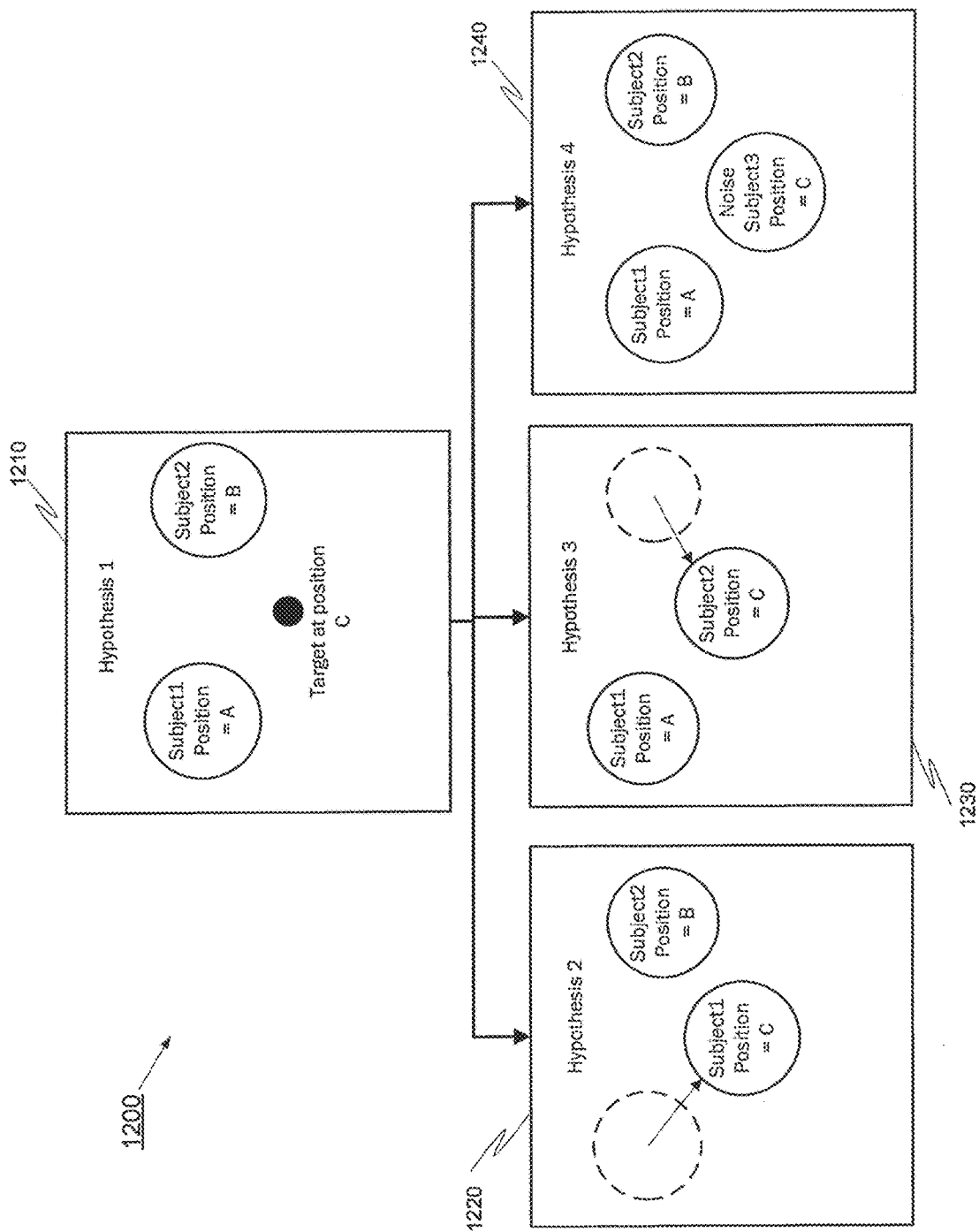
FIG. 12 shows an example of generation of new hypotheses, resulting from a new target track, according to an example of the present disclosure.

FIG. 12 shows an example of generation 1200 of new hypotheses, resulting from a new target track. In this simple example, the possibility of subjects entering or leaving the overall space (e.g., building in this example) is ignored (e.g. since there is a definitive door counter data to corroborate this assumption we can ignore). Hypothesis 1 1210 has two subjects, subject 1 is at position 'A', subject 2 is at position 'B'. A new target appears at position C. This results in three hypothesis being created:—the target is associated with subject 1 (hypothesis 2-1220), the target is associated with subject 2 (hypothesis 3-1230), or the target results from environmental noise (hypothesis 4-1240).

Figure 13:
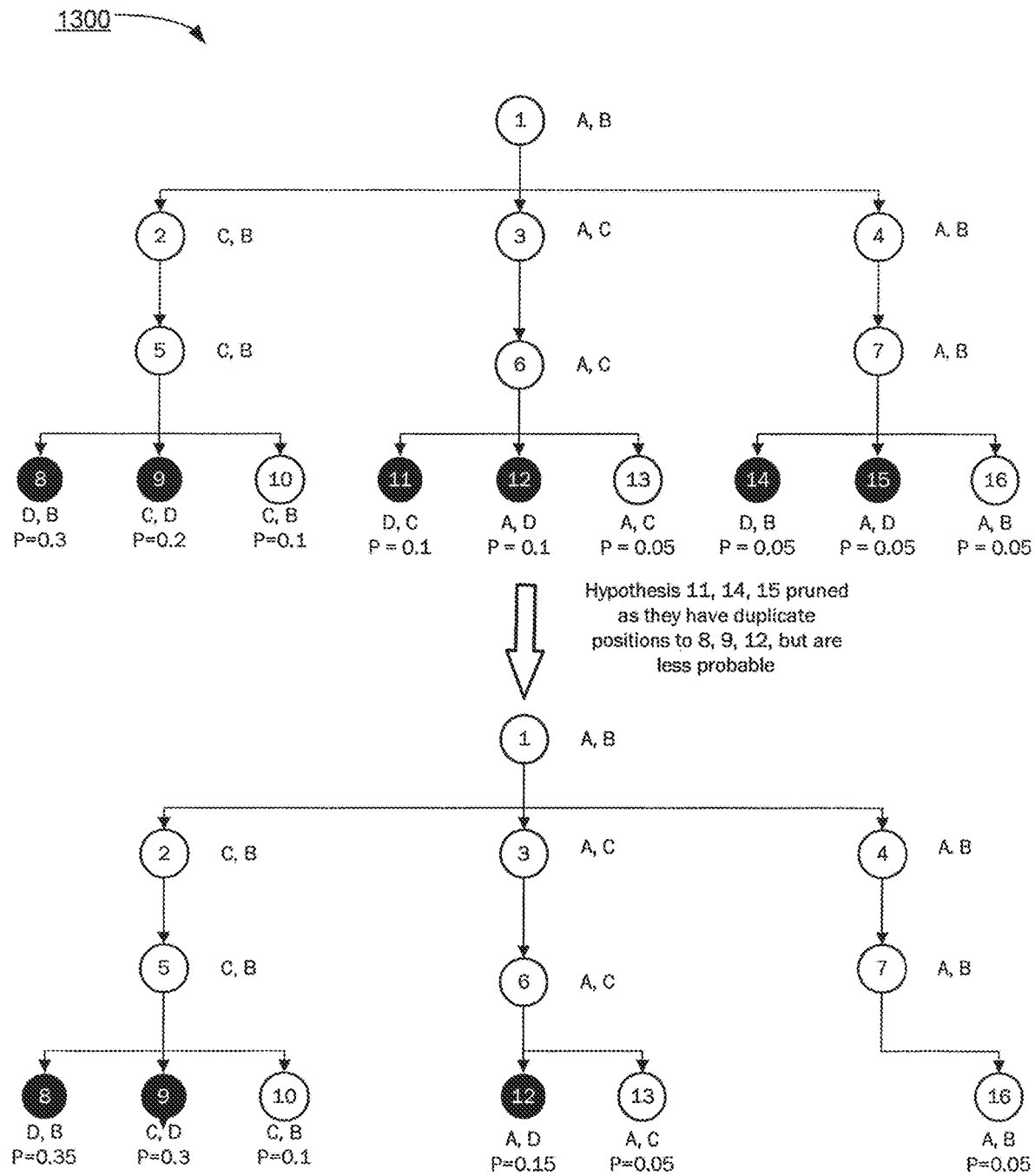
FIG. 13 shows an example sequence of hypotheses generation, according to an example of the present disclosure.

FIG. 13 shows an example sequence 1300 of hypotheses generation, starting from the example of FIG. 11 and the subsequent pruning of hypotheses due to identical states (again ignoring the possibility that subjects enter or leave the overall space=building). In this example, we have a single hypothesis (1), with subject 1 at position 'A' and subject 2 at position 'B', denoted by the label (A, B). A target track starting results in hypotheses (2, 3, 4) being created. The track finishing results in hypothesis (5, 6, 7). A second target track starting results in hypothesis (8 to 16). The result is that some hypotheses are duplicates, in terms of number of subjects and their positions, if we do not care which subject is in which position (e.g. A, B is equivalent to B, A). These duplicates can thus be merged, by keeping only the most probable, and by summing the probabilities of the equivalent hypotheses.

Figure 14:
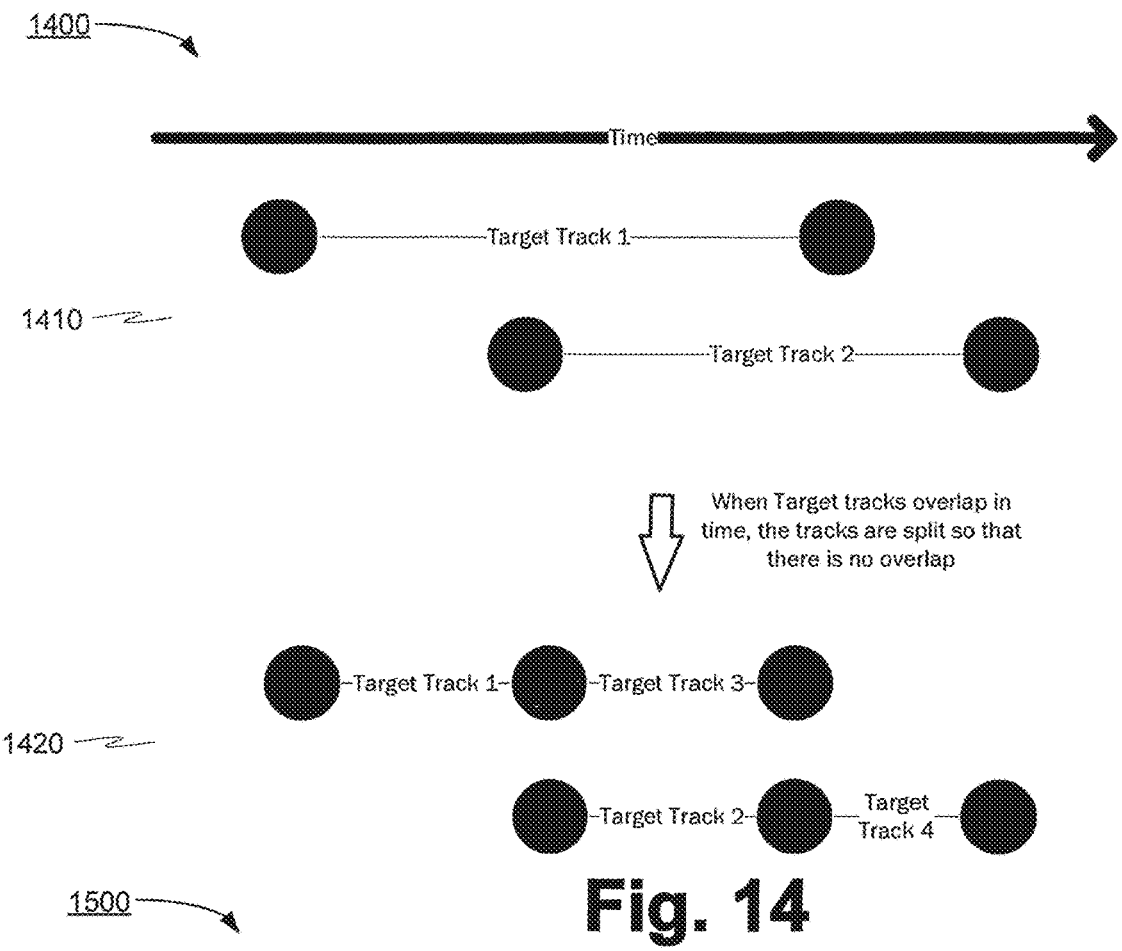
FIG. 14 shows an example of how target tracks that overlap in time are split, to result in non-overlapping tracks.

FIG. 14 shows an example 1400 of how target tracks that overlap in time 1410 are split, to result in non-overlapping tracks 1420. This allows the possibility for subjects to swap from one track to another, which can be important for resolving situations where a subject generates multiple tracks, some of which may be left behind, due to the nature of the targets coming from the sensors.

Figure 15:
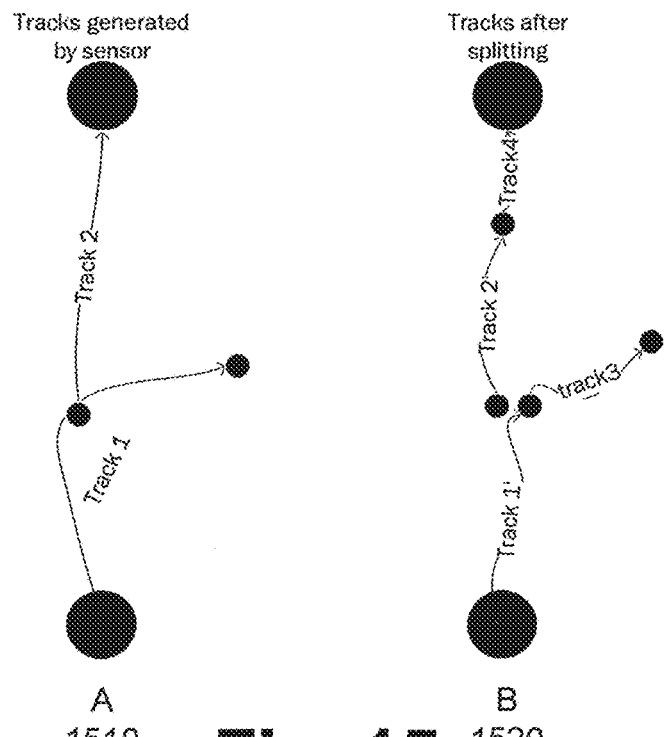
FIG. 15 shows an example of a sequence according to an example of the present disclosure.

FIG. 15 shows an example of a sequence 1500 like that shown in FIG. 14. In this case a subject is tracked by a sensor as two tracks, track 1 which at first correctly follows the true path taken by the subject, but then diverges as a new track, (track 2), begins, before then stopping a short time later. Track 2 follows the true trajectory of the subject. It is difficult for the subject tracker to join track 1 and track 2, as track 1 ends some distance from the start of track 2, both spatially and temporally, meaning that a hypothesis naively following these tracks would have low probability. Splitting the track into segments at the points that each track starts or ends results in tracks 1', 2', 3 and 4. It is then easy for the subject tracker to join tracks 1', 2' and 4, as they are both spatially and temporally close (e.g., the probability of a hypothesis following this sequence is relatively high). Track 3 will end up associated with a short lived noise subject.

Figure 16:
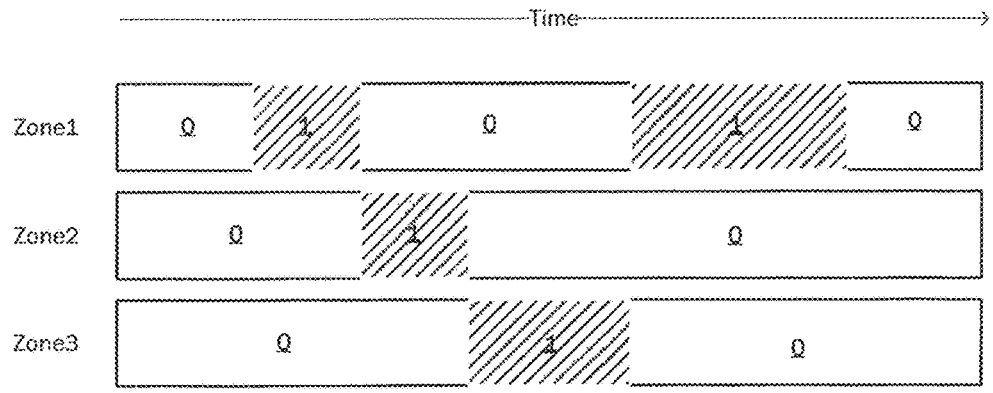
FIG. 16 shows an example of a derived occupancy sequence, according to an example of the present disclosure.

FIG. 16 shows an example of a derived occupancy sequence output, according to an example of the present disclosure. In this example, the subject is determined to have moved from zone 1 to zone 2 to zone 3 back to zone 1, before exiting the monitored overall space entirely.

Figure 17:
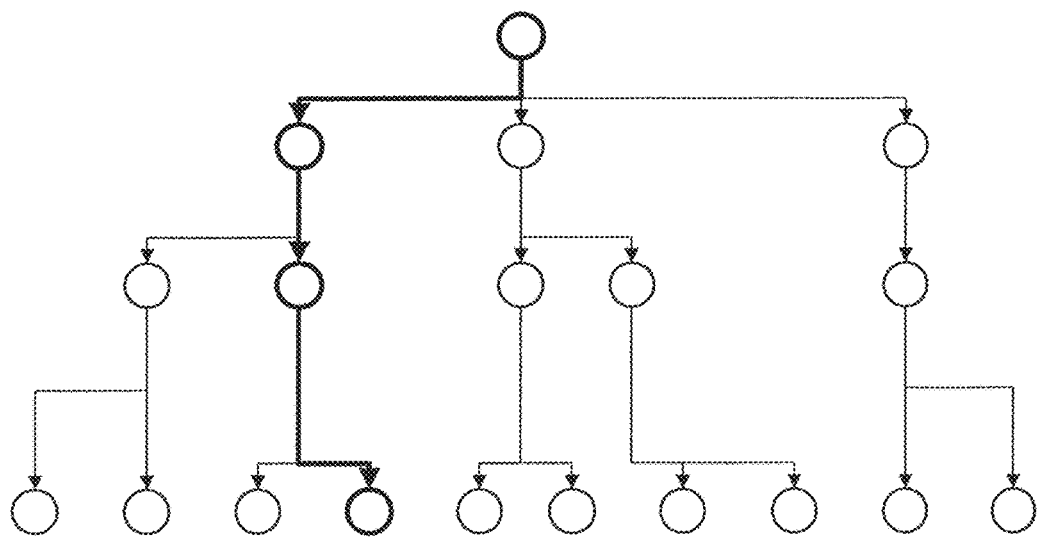
FIG. 17 shows an example of a complete hypothesis tree, with a derived outcome selection, according to an example of the present disclosure.

FIG. 17 shows an example of a complete hypothesis tree, with a derived outcome selection, according to an example of the present disclosure. Here, the actual measured path (in bold) for a given selection of different hypothesis—e.g., the hypothesis tree, can be used to train the same system for later used.

Figure 18:
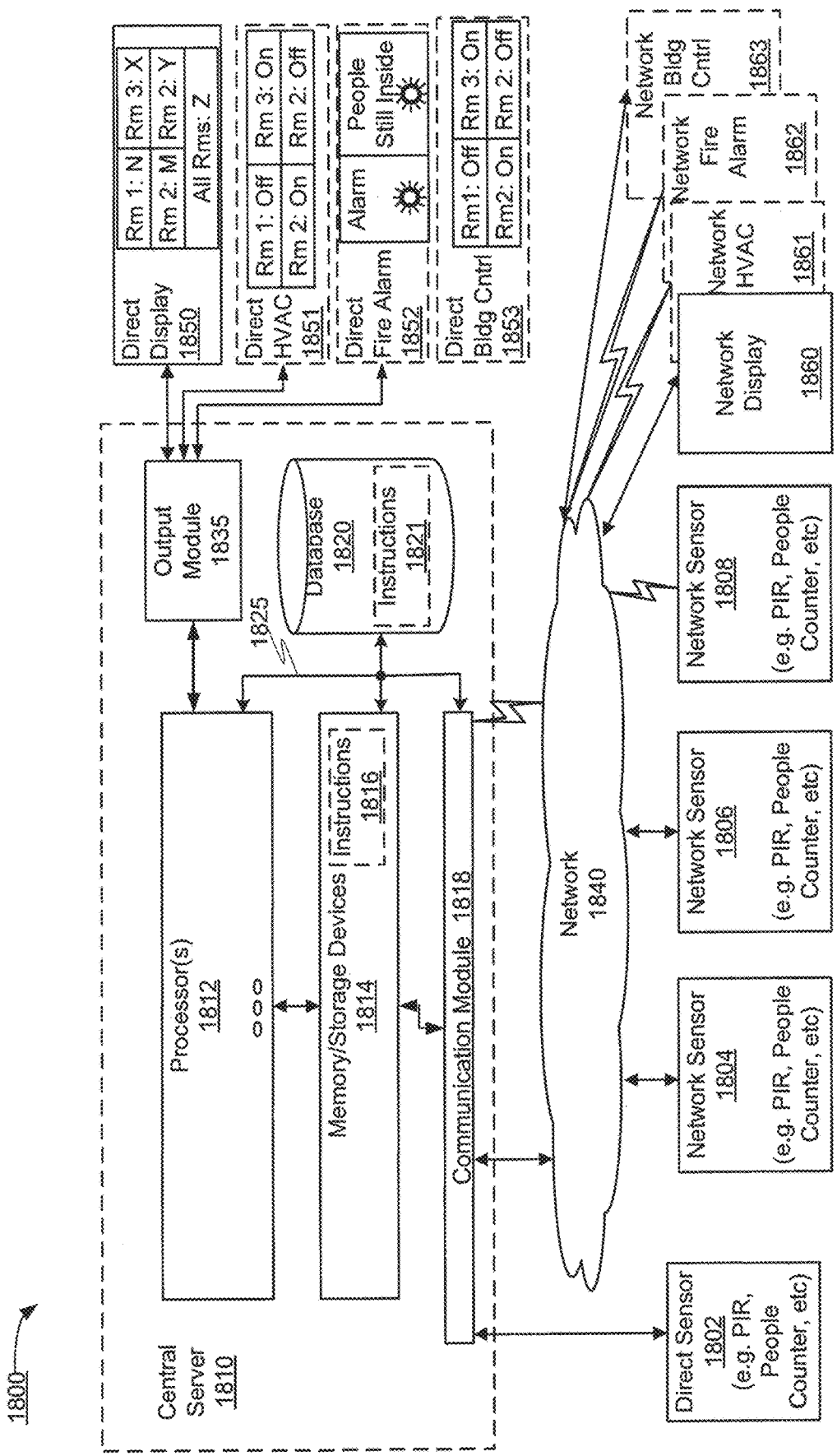
FIG. 18 shows an example of an apparatus for a system tracker/occupancy detection system, according to an example of the present disclosure.

FIG. 18 shows an example of an apparatus for a system tracker/occupancy detection system, according to an example of the present disclosure. FIG. 18 is a block diagram illustrating an example hardware arrangement to carry out the occupancy detection, according to some example embodiments. In this example, the method is carried out on a central server 1810, communicably coupled to a number of counter/sensors 1802-1808. The sensors may be communicably coupled to the server 1810 by a variety of means, such as direct wire (as per sensor 1802), via a network/IP 1840 (as per sensors 1804, 1806), or wirelessly (via network or directly, e.g. via ZigBee or the like), as per sensor 1808. The network 1840 may also be wireless. The network may also be coupled to networked versions of any of: displays 1860, HVAC systems 1861, fire alarms 1862, building control systems 183, etc. As well as or instead, the system may be directly connected to such systems (display, HVAC, etc., as discussed in more detail below).

The central server 1810 may include one or more processors (or processor cores) 1812, one or more memory/ storage devices 1814, and one or more communication resources, such as communication module 1818, each of which are communicatively coupled via a bus 1825, or directly. The one or more memory/storage devices 1814 may include/store instructions 1816 for the processor 1812 to carry out the described methods.

The central server 1810 may include a data store, such as database 1820, or the data store may be remote from the central server 1810 (not shown). The database 1820 may instead or as well include the instructions operable to carry out the described methods on the processor(s) 1812.

The memory/storage devices 1814 may include main memory, disk storage, or any suitable combination thereof.

The communication module 1818 may include interconnection and/or network interface components or other suitable devices to communicate with one or more peripheral devices, and in particular, the one or more sensors networked 1802-1808, or networked output devices (e.g., devices that make use of the occupancy data)—e.g., display device 1860, HVAC 1861, fire alarm 1862, building control 1863, and the like. For example, the communication resources may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 1816 may comprise software, a program, an application, an applet, an app, or other executable code for causing at least any of the processors 1812 to perform any one or more of the methodologies discussed herein. The instructions 1816 may reside, completely or partially, within at least one of the processors 1812 (e.g., within the processor's cache memory), the memory/storage devices 1814, or any suitable combination thereof. Accordingly, the memory of processors 1812, the memory/storage devices 1814, and the databases 1820 are examples of computer-readable and machine-readable media, for example, comprising non-transitory instructions.

As used herein, the term processor may refer to, be part of, or include an Application Specific Integrated Circuit (ASIC), an electronic circuit, circuitry, a processor (shared, dedicated, or group), and/or memory (shared, dedicated, or group) that execute one or more software or firmware programs, a combinational logic circuit, and/or other suitable hardware or software components, or other means for carrying out each or the total functionality described, including a one or more virtual machines that can provide the described functionality. In some embodiments, the processor may be implemented in, or functions associated with the processor may be implemented by, one or more software or firmware modules. In some embodiments, processor may include logic, at least partially operable in hardware. In some embodiments, the processing/execution may be distributed instead of centralized processing/execution.

The central server may also comprise an output module 1835, operable to couple to any one or more of a number of external devices that can use the determined occupancy of the overall space to drive or otherwise control a useful function. The form and exact function of the output module may be dependent on the use case, however, by way of example only, the output module may be a circuit configured to output digital signals indicative of the occupancy of the different zones of the overall space.

Examples may provide an occupancy detection system comprising two or more zones in which the occupancy is to be determined, which together make up a larger location, e.g. a building, where the ways of travelling from one zone to another have counting sensors positioned to count the traffic in each direction between the zones, or between a zone and the outside of the larger location (e.g. people entering/leaving a building), and where the occupancy detection system provide occupancy detection to another device of function within the same device that can make use of the occupancy data to drive a variety of useful or even critical real life functions.

Examples of the real life function that can make use of the occupancy data (or base subject tracking data, as applicable) may include, but is not limited to:

Direct display, e.g. display 1850—here shown to provide occupancy of different rooms in a building, and total occupancy. This may be useful for example, in a shared building, public building, large building, etc. The raw occupancy data may be used to drive any decision affecting the building for which occupancy data is key.

HVAC systems 1851—e.g. occupancy detection can turn on or off heating, air conditioning, ventilation, etc., according to the needs of the detected occupants—this may include as well or instead adjustment of operation rates of these function, as opposed to simply on/off control as shown.

Fire Alarms 1852—these may then additionally indicate to relevant persons (e.g. fire men, fire control wardens) at a single glance when there are still occupants in the building, hence needing saving, evacuation and the like. These indications can be global, or on a per room basis.

Direct building control 1853—this is a broader implementation of control, for example, to include electrical outlets, and the like, or to drive decisions on how a malleable building environment may be changed to better suit the use at a given point in time—e.g. opening additional meeting rooms, additional space in a large conference center, and the like. It may also drive longer term building changes, such as extensions to be build, etc.

The aforementioned HVAC, fire alarm and building controls (and/or other related functions using the occupancy data) may be collectively referenced as smart building controls, where these may comprise buildings that deliver useful building services that make occupants productive (e.g. illumination, thermal comfort, air quality, physical security, sanitation, and many more) at the lowest cost and environmental impact over the building lifecycle. These may use intelligence from the beginning of design phase through to the end of the building's useful life. Such smart buildings may use information technology during operation to connect a variety of subsystems, which typically operate independently, so that these systems can share information to optimize total building performance. Smart buildings may therefore look beyond the building equipment within their four walls—for example they may be connected and responsive to the smart power grid, and they may interact with building operators and occupants to provide them with new levels of control and global, regional or personal optimizations of the building to the occupants needs.

According to examples, the plurality of counting sensors may have their counts fed over a network into a central server.

According to examples, an apparatus, for example the central server of FIG. 18, may determine figures for the occupancy of the building overall, and the individual zones by breaking down the problem into a hierarchical one of determining first the occupancy of the outer zone (e.g., building overall), then determining the occupancy of the zones that make up the outer zone, and then rescaling them such that they sum to the already calculated outer zone total occupancy. Optionally, the method/apparatus may apply the above procedure to further zones which are fully enclosed, e.g. the floor of a building, which contains several self-contained offices, might also be treated as another outer zone, with the offices being sub-zones within it. In this case, the office's total occupancy is scaled such that it sums to the already determined floor total.

The disclosed occupancy detection and subject tracker apparatus and methods may be particularly applied to the problem of tracking people in public buildings, where there is a need for accurate occupancy detection for a variety of reasons—safety (e.g. for fire alarms—to ensure complete evacuation), heating (to reduce energy wastage, etc.). Accordingly, examples of the present disclosure may be thought of as improved building control apparatuses, improved Fire alarm apparatuses and the like—e.g., an improved apparatus for which a problem to be solved in order for that apparatus to actually work or be of use, or work better, is to accurately determine the occupancy and then act upon that data in some meaningful and useful way, such as at least to display that information to a user or controller of the respective apparatus, or to activate another action, device or the like, such as is the case in fire alarms, heating control, etc. Much like determining the speed of a car, wheel slippage, etc. allows the provision of antilock braking systems in the first place, and improvement in these detecting apparatuses and methods to provide improved antilock braking systems. Returning to occupancy detection—building HVAC (as well as lighting) controls that are improved by being able to accurately and reliably detect the people within, so that such systems are installed because they are not so inaccurate as to be more a hindrance than a help, would likely be the one of the more effective ways to reduce the significant personal environmental impacts (e.g., $CO_2$ emissions, etc.) of modern human life.

In this context, the number of people within an office space, may wish to be known, for the purpose of efficiently using that space.

Accordingly, examples of the present disclosure may be adapted to take input not only from people counters above doorways, as well as one or more PIR type sensors within rooms, etc., but also from wireless devices located across a single room/zone to be monitored. In these examples, an estimate for the amount of activity in the room could be estimated by monitoring the strength of the wireless signal between the wireless devices—which is related to the amount of people therebetween, and hence can be correlated to the use.

In some other examples, a wireless beacon system may also be used, connected to mobile devices, which allowed the presence of particular people within each meeting room to be determined, if they carry their device with them. Where a disclosed subject tracker system is modified to use wireless devices, either as a direct measure of the wireless environment, or as beacon type (e.g., Bluetooth, Wi-Fi, or similar) identification, then it is also possible to additionally provide a more realistic likelihood of observing a given strength of wireless signal given a certain number of people being in the space (e.g., providing an occupancy derived signal strength meter).

Accordingly, one advantage of the present disclosure is that the parameters governing the wireless signal strength based estimate of occupancy could be determined automatically using an expectation maximization approach, based upon the results of the other sensors, allowing the system to automatically tune the parameters, which might otherwise require significant manual effort, since wireless signal strength will depend upon many environmental factors.

Advantages of the present disclosure, as it pertains to occupancy detection alone, are numerous and include: there are no security/privacy issues, as there is no need to use detector that can be a privacy concern, such as camera, under desk monitoring, wearable tags, or the like; it is relatively inexpensive to implement, because the sensors do not have to have complete coverage (examples may have gaps in the respective sensor's 'field of view', or even whole areas which are unmonitored, because the disclosed hypothesis system is able to "fill in the gaps" in order to keep track of subjects who are not (directly being) observed; it is relatively high accuracy, because the disclosed multi hypothesis system can take advantage of constraints and reasoning to exclude many environmental problems, because those environmental problems are not consistent with the rest of the evidence.

Furthermore, there are numerous further advantages of the disclose occupancy detection apparatuses and methods when applied to other areas where the occupancy data is used to derive control another action of requirement—e.g. fire alarms, HVAC or building control and the like, as noted above.

Examples relate to a system, method and apparatus/device which uses results obtained from a network of people counter(s) (or other person sensing devices/means), combined with a central processing device, in order to accurately estimate the number of persons that are occupying a number of distinct regions within a larger overall (predefined) space. Examples may also be referenced herein as a subject tracker system, since the occupancy detection methods described to determine occupancy may also inherently track movement of the subjects/targets (e.g., people being tracked) around the overall space. The extent of this subject tracking capability will become readily apparent from the below detailed description.

The central processing device may include various outputs to other system that may use the accurately determined occupancy data for various control, detection and warning purposes, such as, but not limited to turning on/off lights, heating, etc., warning if persons are still occupying a space when they should not be, what levels of people are occupying an overall space over time, and the like (see FIG. 18 below, for example).

The distinct regions, or zones, within the larger space may be, for example; rooms, sub-portions of rooms, or other spaces within a building (e.g. factory, warehouse, theatre, cinema, flat, house, leisure center or any other building); seats, carriages and connecting areas within a vehicle, particularly a mass transit vehicle (e.g. train, ship, plane, or the like). Examples of the present disclosure may be applicable to the tracking of the occupancy of any spaces or sub-regions thereof, which are interconnected in the sense of free movement of trackable entities therein or there between, where a trackable entity may be any moving entity (but which is typically a person or animal, e.g., one having a thermal signature) and where the trackable entities may occupy the tracked spaces or sub-regions thereof over time.

Examples of the present disclosure are directed to determining the occupancy of an overall space comprising a plurality of zones, which are connected together via doorways, corridors, stairs, etc., or are physically adjoining areas. Examples may comprise a plurality of sensor devices that detect motion or presence, for example a plurality of thermal sensing devices, located around and about the zones(s) of which the occupancy is to be determined. The detected motion or presence information may be sent to a central processor, along with location information relating to the detection. The central processor may hold (or be operably coupled to) a data store, which has information relating to the layout of the zones under occupancy observance, e.g., the positions of the zones within the overall space, the positions of portals between zones (e.g. doors, windows, etc.), positions and overlap between detectors within the zone(s), and a graph of connectivity between zones, which may include unmonitored interim regions. The central processor stores a probabilistic model (e.g., a statistical analysis tool that estimates the probability of a sequence of events given a sequence of observations based upon theoretic models and/or empirical results) for the number of people in each room, possibly including their individual locations, which is driven by evidence from the detected activity, in particular the accumulation over time of evidence from detected motion/activity, and the detection of arrivals/departures into zones, through portals, or crossing the overlap between sensors (e.g. where the fields of detection of sensors overlaps). Given all these inputs, the central processor determines the scenario with the highest probability given all of the evidence, and outputs this as the current occupancy.

Examples may provide an Occupancy system with at least connectively to a plurality of sensor devices that detect motion or presence, wherein the sensors send information on activity to a server. Doors and/or overlap between sensors may be identified, and a connectivity representation created by the occupancy system. A probabilistic model may be provided in the occupancy system for number of people in each room, which considers evidence from the (network of)

sensors/rooms. The model may accumulate evidence over time, from, for example, detected motion or presence, and detected arrivals/departures through doors or between overlapping sensors. The occupancy system may select the scenario with the highest probability given all the evidence from all of the sensors as the most likely current state (of occupancy) for the overall area, or individual zones making up the overall area. In some examples, the sensors use passive IR sensors, e.g. pyroelectric sensors, to form a 2D image. Inputs may be taken from door opening sensors, to determine if the entrance to the building open. PIR security inputs may be used, to signal activity in corridors, or outside the entrance to the building. The probabilistic model may be a multi-hypothesis system. Retrospective results calculated using the most-likely path which finishes in the current highest probability state (e.g., forward/backward algorithm) may be used to select a most likely occupancy scenario given the implications of the inputs to the system over time. In some examples, a network of connected units may also include "unmonitored spaces", e.g., corridors which are unmonitored but which link monitored rooms/spaces. Alerts can be raised based upon unusual activity, unexpected numbers of occupants, or inactivity. Reports of occupancy and activity can be generated, both live and historic. Results can be displayed on mobile devices, and computers.

The disclosed occupancy system may be trained initially, using labelling of the number of people in each room over time. The training problem may then be to maximize the probability of following a path which flows through this set of labelled states. Where there is a time difference between manual and system events, a time-cost function is used to penalize larger differences in time. A cost may be associated with persons remaining in unmonitored spaces for an extended period of time. For example, the data may be labelled manually, by saying how many people are in each zone, and then the task is to find parameters for the model in use, so that the most likely hypotheses will agree as closely as possible with the manually labelled result. So, say it is known that there is a sequence of data where there is nobody in the house, then two people enter, and one goes into the kitchen while the other goes into the living room, then leaves, etc. In such a case, it is may be desirable to find the sequence of hypotheses that agree with this as closely as possible, and then make it so that it is the most likely to be followed, compared to hypotheses sequences where e.g., only one person enters the house, or the second person doesn't leave but stays standing by the front door forever, etc.

Also, according to examples of how the system is trained, it may be beneficial to have a means of generating suitable parameters for the method. This may be done by, for example, generating a large number of examples of each event type and fitting models to each of them. According to some specific examples, a method may be used for the training, where it is decided in advance which of the sequence of hypotheses that it is wished to be followed (e.g. the one which follows the manually labelled data most closely), and then the likelihood that we follow that path is maximized, which allows us to fit all of the parameters at once, including some that are particularly difficult to otherwise model, such as the noise distribution.

In terms of hypothesis management, equivalent hypotheses may be merged. Hypotheses which can never become selected as the most probable in the future may be merged. Hypotheses may be limited in terms of total numbers to a maximum value that depends upon the application and resources available. Hypotheses may be merged based on similarity in terms of number of people and their location.

In some examples system operates on animals or vehicles rather than humans. Rather than a home or office building and rooms, the system covers some other space, such as parts of a factory floor, car park, pavements, stadium, jail, hospital, school or road, possibly including multiple linked buildings. Other imaging sensing technology may be used such as: Active IR sensors (thermal imaging camera); Video sensors; Stereo video sensors; Time of flight sensors; Structured lighting sensors; Laser scanner; Some other direct activity/tracking technology, such as: radar; sonar; pressure sensors; EM field variation sensors.

The probabilistic models used may be a Markov Model, Hidden Markov Model, Neural network, or Bayesian inference engine. Entry detection can be from a separate sensor to activity/motion detection, e.g. a door sensor might be a people counter, IR beam breaker, pressure sensor, etc. Motion sensors within rooms could then be a passive IR imager, sound sensor, wide angle video sensor, wireless modulation sensor, etc.

The sensors and server may be wirelessly linked, the central processing functionality may be built into one of the sensors, or into a separate server, be a function which may be distributed over the sensors network. Server functionality may be at a remote location, e.g., on the internet or an intranet. Results may be fed into other systems, such as a building HVAC controller, a system for predicting future occupancy, or a staff scheduling system.

Examples provide an apparatus for detecting occupancy of an area wherein the area comprises one or more zones, the apparatus comprising circuitry operable to: receive sensor data from one or more sensors; receive or store data about an arrangement of the zones in the area; and output an indication of the occupancy of the area; wherein the apparatus further comprises processing circuitry coupled to the output and operable to: receive the data from the one or more sensors; and determine an occupancy of the one or more zones of the area by one or more trackable entities by being further operable to: determine a connectivity between zones within the area; and apply a probabilistic model to determine a number of subjects in a zone; wherein the probabilistic model considers and accumulates the data from the one or more sensors over time; and wherein a scenario with a highest probability of having occurred given all the data accumulated from all of the sensors in use is selected as the most likely current state of occupancy of the area for output.

In some examples, the processing circuitry is further to iteratively update the probabilistic model and/or the scenarios of potential occupancies from new data received from the one or more sensors to create a new set of scenarios, and select a new one of the new scenarios that is a highest probability scenario of the occupancy.

In some examples, at least one of the one or more sensors is a Passive InfraRed (PIR) sensor that provides a 2D image map of the occupancy of an area of a zone under observation by the at least one PIR sensor.

In some examples, the area comprises portals between zones, and wherein the area has at least one defined entrance or exit. In some examples, the model determines if a portal is useable to determine a movement of a subject within the area. In some examples, a portal is defined as an entrance or exit from the area and further comprises an additional sensor to determine activation of the entrance or exit. In some examples, the additional sensor is a dedicated door sensor and operable to determine the entrance or exit is open or closed.

In some examples, the one or more zones includes at least one unmonitored zone, wherein an unmonitored zone is a zone or part thereof having no sensor.

In some examples, the occupancy is determined using retrospective results calculated from using a most likely path which finishes at a current highest probability state. In some examples, the retrospective path uses forward and backward algorithms. In some examples, the probabilistic model in use comprises a multiple hypothesis model. In some examples, a trackable entity is a person. In some examples, the processing circuitry is located in a server, and the one or more sensors are networked sensors or directly connected sensors.

In some examples, the one or more sensors comprise any one or more of: an active IR sensor (thermal imaging camera); a video sensor; a stereo video sensor; a Time of flight sensor; a structured lighting; a laser scanner; a radar sensor; a sonar sensor; a pressure sensor; an EM field variation sensor.

In some examples, the one or more sensors detect at least one of: a presence of a trackable entity; a movement of a trackable entity; a thermal signature of a trackable entity.

In some examples, the output is useable to activate any one or more of: a display of occupancy, an activation of an alarm, an activation of a function related to an occupancy level of the area or portion thereof. In some examples, the function includes control of an activity related to occupancy (e.g. HVAC, lighting, etc.).

In some examples, an alarm includes an alert, and the alert comprises an indication of any one or more of: an unusual activity within the one or more zones; an unexpected level of occupancy in the one or more zones; and/or an inactivity in the one or more zones. In some examples, the area comprises an overall space. In some examples, the one or more zones comprises a plurality of sub-areas, wherein each sub-area is sensed by at least one sensor. In some examples, a portal is a real life portal by which a trackable entity can pass, or a virtual portal comprising an edge of a sensor sensing zone.

In some examples, the output of an indication of the occupancy of the area comprises and one or more of: live, historic or projected future occupancies. In some examples, the apparatus is trained using labelling of number of subject states in each zone over time, and wherein the apparatus is arranged to maximize the probability of following a path which flows through this set of labelled subject states, and wherein there is a time difference between manual and system events, and a time-cost function is used to penalize larger differences in time. In some examples, a cost is associated with subjects remaining in unmonitored spaces for an extended period of time.

In some examples, the probabilistic model uses hypotheses, and wherein: equivalent hypotheses are merged; hypotheses which can never become selected as the most probable in the future are merged; hypotheses are limited in terms of total numbers to a maximum a value that depends upon the application and resources available; and/or hypotheses are merged based on similarity in terms of number of people and their location.

In some examples, a Probabilistic model in use is a Markov Model, Hidden Markov Model, Neural network, or Bayesian inference engine.

Examples also provide a computer program product comprising instructions, which, when executed by one or more processors, causes the one or more processors to carry out a method for detecting occupancy of an area wherein the area comprises one or more zones, the method comprising: receiving sensor data from one or more sensors; receiving or store data about an arrangement of the zones in the area; and outputting an indication of the occupancy of the area; wherein the method further comprises: receiving the data from the one or more sensors; and determining an occupancy of the one or more zones of the area by one or more trackable entities by the method further comprising: determining a connectivity between zones within the area; and applying a probabilistic model to determine a number of subjects in a zone; wherein the probabilistic model considers and accumulates the data from the one or more sensors over time; and the method further comprises: selecting a scenario with a highest probability of having occurred given all the data accumulated from all of the sensors in use as the most likely current state of occupancy of the area for output.

In some examples, the method further comprises iteratively updating the probabilistic model and/or the scenarios of potential occupancies from new data received from the one or more sensors to create a new set of scenarios, and selecting a new one of the new scenarios that is a highest probability scenario of the occupancy.

In some examples, the method further comprises determining if a portal is useable to determine a movement of a subject within the area.

In some examples, the method further comprises determining the occupancy using retrospective results calculated from using a most likely path which finishes at a current highest probability state. In some examples, the method further comprises using a probabilistic model comprises a multiple hypothesis model.

In some examples, the method further comprises activating any one or more of: a display of occupancy, an activation of an alarm, an activation of a function related to an occupancy level of the area or portion thereof.

In some examples, the method further comprises controlling an activity related to occupancy of the area (e.g., an overall space).

Examples also provide methods, computer program products and apparatuses for smart building control, for example controlling building functions dependent on detected occupancies of the building and rooms or area making up the building and its environs.

In the foregoing, references made to hypotheses in the plural, or hypothesis in the singular may be interchanged, according to circumstances.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

What is claimed is:

1. A system for improved occupancy detection in an area comprising a plurality of zones including determining a distribution of subjects among the plurality of zones within the area, the system comprising:
   one or more sensors, each sensor being associated with one or more of the plurality of zones and configured to provide sensor data representative of detected activity in the associated one or more of the plurality of zones;
   one or more processors in communication with the one or more sensors and configured to:
      receive sensor data from the one or more sensors over time;
      receive or store data regarding an arrangement of the plurality of zones in the area including connectivity between the zones in the plurality of zones, wherein the plurality of zones includes at least one unmonitored zone, wherein an unmonitored zone is a zone or part thereof having no sensor;

apply a probabilistic model to the received sensor data and the received or stored data to determine a number of subjects within each zone of the plurality of zones including the at least one unmonitored zone, wherein the probabilistic model considers the sensor data received from the one or more sensors over time and determines a highest probability scenario among a plurality of possible scenarios corresponding to the most likely current state of occupancy of the area; and output an indication of the occupancy of the area and the distribution of subjects among the plurality of zones based on the probabilistic model.

2. The system of claim 1, wherein the one or more processors are further configured to:

iteratively update one or more of the probabilistic model and scenarios of potential occupancies from new data received from the one or more sensors to create a new set of scenarios; and select a new one of the new scenarios that is a highest probability scenario of the occupancy.

3. The system of claim 1, wherein the area comprises portals between zones of the plurality of zones, and wherein the area has at least one defined entrance or exit.

4. The system of claim 3, wherein the probabilistic model determines if a portal is useable to determine a movement of a subject within the area.

5. The system of claim 1, wherein the occupancy is determined using retrospective results calculated from using a most likely path which finishes at a current highest probability state.

6. The system of claim 1, wherein the probabilistic model in use comprises a multiple hypothesis model.

7. The system of claim 1, wherein the one or more sensors comprise:
   an active IR sensor;
   a video sensor;
   a stereo video sensor;
   a time of flight sensor;
   a structured lighting;
   a laser scanner;
   a radar sensor;
   a sonar sensor;
   a pressure sensor; or
   an EM field variation sensor.

8. The system of claim 1, wherein the one or more sensors detect:
   a presence of a trackable entity;
   a movement of a trackable entity; or
   a thermal signature of a trackable entity.

9. The system of claim 1, wherein the output is useable to activate any one or more of: a display of occupancy, an activation of an alarm, an activation of a function related to an occupancy level of the area or portion thereof.

10. The system of claim 1, wherein the system has been trained using labelling of number of subject states in each zone over time, and wherein the system is arranged to maximize the probability of following a path which flows through this set of labelled subject states, and wherein there is a time difference between manual and system events, and a time-cost function is used to penalize larger differences in time.

11. The system of claim 1, wherein a cost is associated with subjects remaining in unmonitored spaces for an extended period of time.

12. The system of claim 1, wherein the probabilistic model uses hypotheses, and wherein one or more of the following occurs:
   equivalent hypotheses are merged;
   hypotheses which can never become selected as the most probable are merged;
   hypotheses are limited in terms of total numbers to a maximum a value that depends upon an associated application and resources available; and
   hypotheses are merged based on similarity in terms of number of people and their location.

13. The system of claim 1, wherein the probabilistic model in use is a Markov Model, Hidden Markov Model, Neural network, or Bayesian inference engine.

14. A non-transitory computer-readable medium comprising instructions, which, when executed by one or more processors, causes the one or more processors to carry out a method for improved occupancy detection within an area wherein the area comprises a plurality of zones, the method comprising:

receiving data regarding an arrangement of the plurality of zones in the area;

determining a connectivity between the plurality of zones within the area;

receiving sensor data generated by one or more sensors over time, each sensor being associated with one or more of the plurality of zones and configured to provide sensor data representative of detected activity in the associated one or more of the plurality of zones, the sensor data being representative of an occupancy of one or more of the plurality of zones, wherein the plurality of zones includes at least one unmonitored zone, wherein an unmonitored zone is a zone or part thereof having no sensor;

applying a probabilistic model to the received sensor data to determine a number of subjects within each zone of the plurality of zones including the at least one unmonitored zone, wherein the probabilistic model considers and accumulates the sensor data from the one or more sensors over time and determines a probability for each a plurality of scenarios having occurred;

selecting the scenario having the highest probability of having occurred as the most likely current state of occupancy of the area;

determining an occupancy of each of the plurality of zones of the area according to the selected scenario; and outputting an indication of the occupancy of the area and the distribution of subjects among the plurality of zones.

15. The non-transitory computer-readable medium of claim 14, wherein the method further comprises:
   iteratively updating one or more of the probabilistic model and scenarios of potential occupancies from new data received from the one or more sensors to create a new set of scenarios; and
   selecting a new one of the new scenarios that is a highest probability scenario of the occupancy.

16. The non-transitory computer-readable medium of claim 14, wherein determining the occupancy of each of the plurality of zones comprises using retrospective results calculated from using a most likely path which finishes at a current highest probability state.

17. The non-transitory computer-readable medium claim 14, wherein the method further comprises using a probabilistic model comprises a multiple hypothesis model.

18. The non-transitory computer-readable medium of claim 14, wherein the method further comprises activating any one or more of: a display of occupancy, an activation of an alarm, an activation of a function related to an occupancy level of the area or portion thereof.

19. The non-transitory computer-readable medium of claim 17, wherein the probabilistic model uses hypotheses, and wherein the method further comprises one or more of:
  merging equivalent hypotheses;
  merging hypotheses which can never become selected as the most probable;
  limiting hypotheses, in terms of total numbers, to a maximum value that depends upon an associated application and resources available; and
  merging hypotheses based on similarity in terms of number of people and their location.

* * * * *